(12) United States Patent
Hirayama et al.

(10) Patent No.: US 6,708,150 B1
(45) Date of Patent: Mar. 16, 2004

(54) SPEECH RECOGNITION APPARATUS AND SPEECH RECOGNITION NAVIGATION APPARATUS

(75) Inventors: Yoshikazu Hirayama, Zama (JP); Yoshiyuki Kobayashi, Zama (JP)

(73) Assignee: Zanavi Informatics Corporation, Zama (JP)

( * ) Notice: Subject to any disclaimer, the term of this patent is extended or adjusted under 35 U.S.C. 154(b) by 399 days.

(21) Appl. No.: 09/659,679

(22) Filed: Sep. 11, 2000

(30) Foreign Application Priority Data

| Sep. 9, 1999 | (JP) | ............................................. 11-255982 |
| Sep. 9, 1999 | (JP) | ............................................. 11-255983 |
| Sep. 9, 1999 | (JP) | ............................................. 11-255984 |
| Feb. 29, 2000 | (JP) | ......................................... 2000-053257 |

(51) Int. Cl.$^7$ ............................................. G10L 15/06
(52) U.S. Cl. ...................... 704/243; 704/251; 704/255; 704/270
(58) Field of Search ................................. 704/243, 251, 704/270, 255

(56) References Cited

U.S. PATENT DOCUMENTS

| 5,027,406 A | * | 6/1991 | Roberts et al. ............... 704/244 |
| 5,191,635 A | | 3/1993 | Fujimoto |
| 5,428,707 A | | 6/1995 | Gould et al. |
| 5,748,840 A | * | 5/1998 | La Rue ....................... 704/254 |
| 5,754,972 A | * | 5/1998 | Baker et al. ................. 704/200 |
| 5,765,132 A | * | 6/1998 | Roberts ....................... 704/254 |
| 5,797,122 A | * | 8/1998 | Spies .......................... 704/244 |
| 5,799,274 A | * | 8/1998 | Kuroda ........................ 704/239 |
| 5,852,801 A | * | 12/1998 | Hon et al. .................... 704/244 |
| 5,865,626 A | * | 2/1999 | Beattie et al. ............... 434/185 |
| 5,956,684 A | * | 9/1999 | Ishii et al. ................... 704/275 |
| 6,108,631 A | * | 8/2000 | Ruhl ........................... 704/270 |
| 6,185,530 B1 | * | 2/2001 | Ittycheriah et al. ......... 704/255 |
| 6,230,132 B1 | * | 5/2001 | Class et al. ................. 704/270 |
| 6,343,270 B1 | * | 1/2002 | Bahl et al. .................. 704/257 |
| 6,349,282 B1 | * | 2/2002 | Van Aelten et al. ........ 704/257 |
| 6,385,579 B1 | * | 5/2002 | Padmanabhan et al. ..... 704/243 |
| 6,393,399 B1 | * | 5/2002 | Even ........................... 704/257 |
| 2002/0069063 A1 | * | 6/2002 | Buchner et al. ............ 704/270 |

FOREIGN PATENT DOCUMENTS

| EP | 0768638 | 4/1997 |
| JP | 09-292255 | 11/1997 |

OTHER PUBLICATIONS

Michael Finke, "Flexible Transcription Alignment" IEEE Journal, 1997.

* cited by examiner

*Primary Examiner*—Susan McFadden
(74) *Attorney, Agent, or Firm*—Crowell & Moring LLP

(57) ABSTRACT

A speech recognition apparatus includes: a speech input device; a storage device that stores a recognition word indicating a pronunciation of a word to undergo speech recognition; and a speech recognition processing device that performs speech recognition processing by comparing audio data obtained through the voice input device and speech recognition data created in correspondence to the recognition word, and the storage device stores both a first recognition word corresponding to a pronunciation of an entirety of the word to undergo speech recognition and a second recognition word corresponding to a pronunciation of only a starting portion of a predetermined length of the entirety of the word to undergo speech recognition as recognition words for the word to undergo speech recognition.

13 Claims, 16 Drawing Sheets

FIG. 1
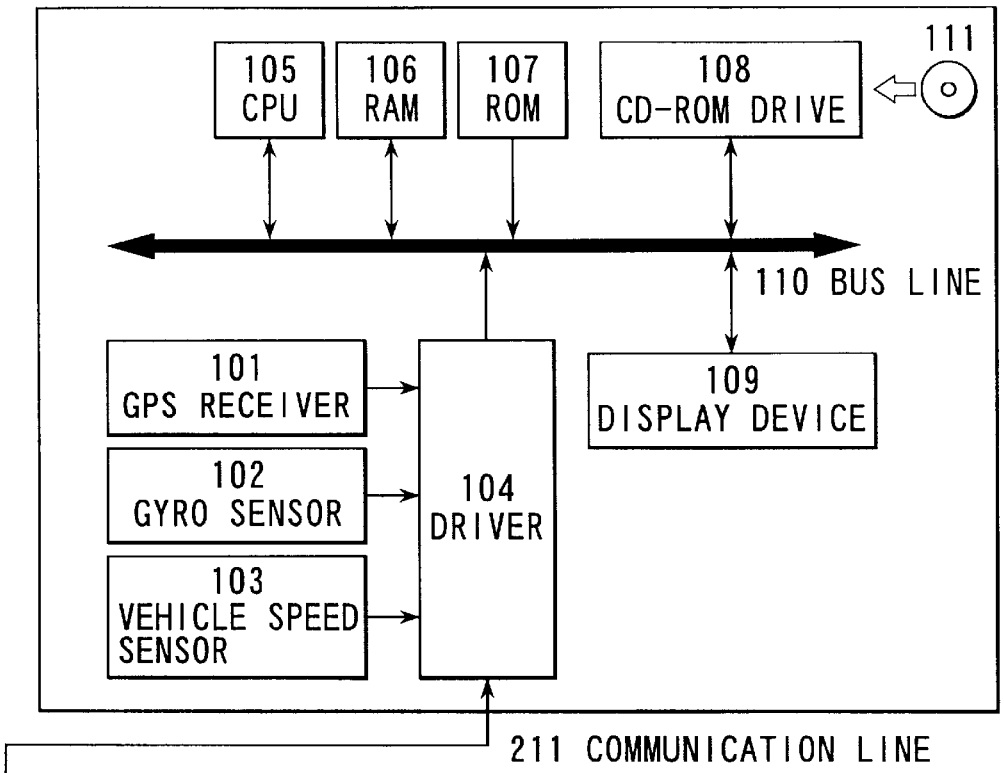
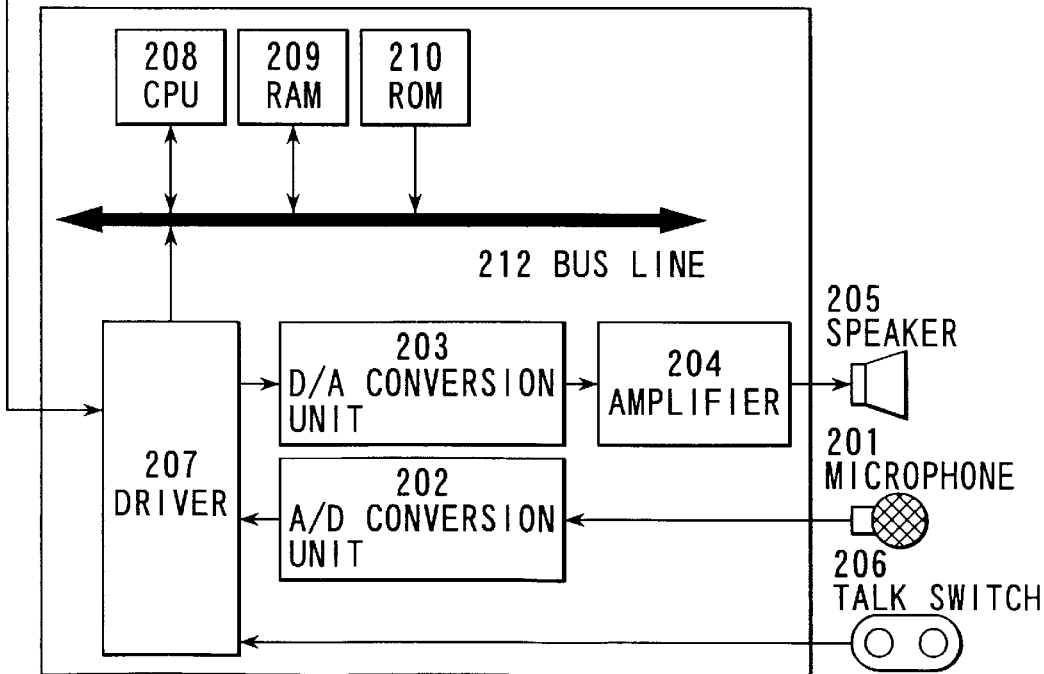

FIG. 2

| RECOGNITION WORD | ADDITIONAL INFORMATION |
|---|---|
| japanesecountryclub | COORDINATE INFORMATION 1 |
| kanagawacountryclub | COORDINATE INFORMATION 2 |
| abccountryclub | COORDINATE INFORMATION 3 |

FIG. 3

| RECOGNITION WORD | ADDITIONAL INFORMATION |
|---|---|
| japanesecountryclub | COORDINATE INFORMATION 1 |
| kanagawacountryclub | COORDINATE INFORMATION 2 |
| abccountryclub | COORDINATE INFORMATION 3 |
| japanese | COORDINATE INFORMATION 1 |
| kanagawa | COORDINATE INFORMATION 2 |
| abc | COORDINATE INFORMATION 3 |

FIG. 5

| RECOGNITION WORD | ADDITIONAL INFORMATION |
|---|---|
| japanesecountryclub | COORDINATE INFORMATION 1 |
| kanagawacountryclub | COORDINATE INFORMATION 2 |
| abccountryclub | COORDINATE INFORMATION 3 |
| apanesecountryclub | COORDINATE INFORMATION 1 |
| anagawacountryclub | COORDINATE INFORMATION 2 |
| bccountryclub | COORDINATE INFORMATION 3 |

FIG. 6

| RECOGNITION WORD | ADDITIONAL INFORMATION |
|---|---|
| Audio | VALID |
| TV | VALID |
| Bird View | VALID |
| Cup | INVALID |
| New York | INVALID |
| Hawaii | INVALID |

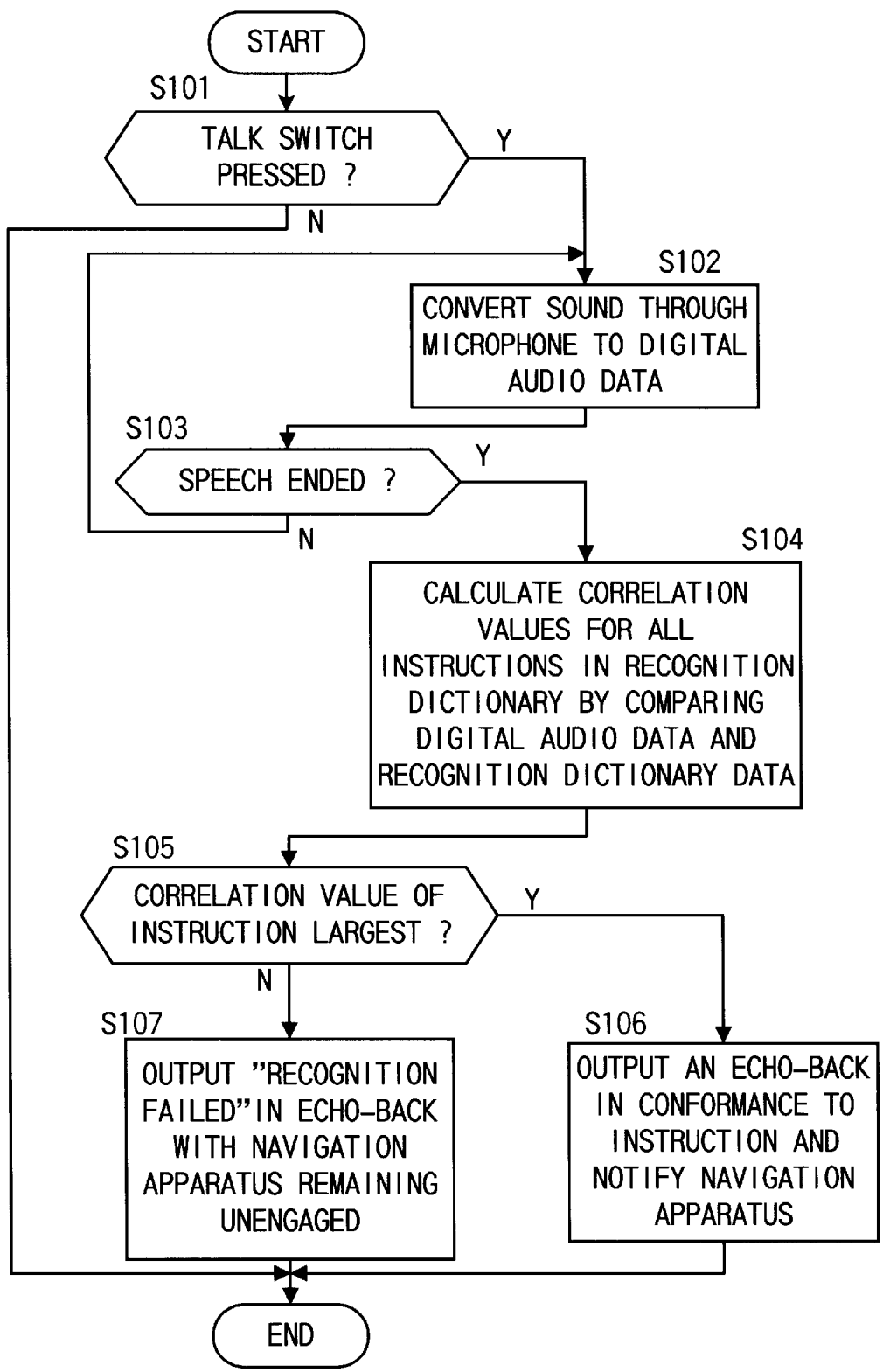

FIG. 8

| DISPLAY | PRONUNCIATION (PHONETIC SYMBOLS) | ADDITIONAL INFORMATION |
|---|---|---|
| Tokyo Central Hospital | toukyousentrəlhɑspitl | COORDINATE INFORMATION 1 |

FIG. 9

| DISPLAY | PRONUNCIATION (PHONETIC SYMBOLS) | ADDITIONAL INFORMATION |
|---|---|---|
| Tokyo Central Hospital | tɔːkyɔːsentrəlhɑspitl | COORDINATE INFORMATION 1 |

FIG. 14

| KEYWORD (PHONETIC SYMBOLS) | ALTERNATIVE PRONUNCIATION (PHONETIC SYMBOLS) |
|---|---|
| toukyou | tɔːkyɔː |

FIG. 15A (POST OFFICE)

| DISPLAY | PRONUNCIATION (PHONETIC SYMBOLS) | ADDITIONAL INFORMATION |
|---|---|---|
| Zama Post Office | zamapostoffice | COORDINATE INFORMATION 1 |

FIG. 15B (STREET)

| DISPLAY | PRONUNCIATION (PHONETIC SYMBOLS) | ADDITIONAL INFORMATION |
|---|---|---|
| Queen Street | queenstreet | COORDINATE INFORMATION 2 |
| Girard Street | girardstreet | COORDINATE INFORMATION 3 |
| Bryant Street | bryantstreet | COORDINATE INFORMATION 4 |

FIG. 15C (INTERCHANGE, RAMP)

| DISPLAY | PRONUNCIATION (PHONETIC SYMBOLS) | ADDITIONAL INFORMATION |
|---|---|---|
| Katsunuma IC | katsunumainterchange | COORDINATE INFORMATION 5 |
| Dangouzaka SA | dangouzakaservicearea | COORDINATE INFORMATION 6 |
| Ishikawa PA | ishikawaparkingarea | COORDINATE INFORMATION 7 |
| Otsuki JCT | otsukijunction | COORDINATE INFORMATION 8 |

FIG. 16A (POST OFFICE)

| DISPLAY | PRONUNCIATION (PHONETIC SYMBOLS) | ADDITIONAL INFORMATION |
|---|---|---|
| Zama Post Office | zamapostoffice | COORDINATE INFORMATION 1 |
| Zama Post Office | zama | COORDINATE INFORMATION 1 |

FIG. 16B (STREET)

| DISPLAY | PRONUNCIATION (PHONETIC SYMBOLS) | ADDITIONAL INFORMATION |
|---|---|---|
| Queen Street | queenstreet | COORDINATE INFORMATION 2 |
| Queen Street | queen | COORDINATE INFORMATION 2 |
| Girard Street | girardstreet | COORDINATE INFORMATION 3 |
| Girard Street | girard | COORDINATE INFORMATION 3 |
| Bryant Street | bryantstreet | COORDINATE INFORMATION 4 |
| Bryant Street | bryant | COORDINATE INFORMATION 4 |

FIG. 16C (INTERCHANGE, RAMP)

| DISPLAY | PRONUNCIATION (PHONETIC SYMBOLS) | ADDITIONAL INFORMATION |
|---|---|---|
| Katsunuma IC | katsunumainterchange | COORDINATE INFORMATION 5 |
| Katsunuma IC | katsunumainter | COORDINATE INFORMATION 5 |
| Katsunuma IC | katsunumaic | COORDINATE INFORMATION 5 |
| Katsunuma IC | katsunuma | COORDINATE INFORMATION 5 |
| Dangouzaka SA | dangouzakaservicearea | COORDINATE INFORMATION 6 |
| Dangouzaka SA | dangouzakasa | COORDINATE INFORMATION 6 |
| Dangouzaka SA | dangouzakaparking | COORDINATE INFORMATION 6 |
| Dangouzaka SA | dangouzaka | COORDINATE INFORMATION 6 |
| Ishikawa PA | ishikawaparkingarea | COORDINATE INFORMATION 7 |
| Ishikawa PA | ishikawaparking | COORDINATE INFORMATION 7 |
| Ishikawa PA | ishikawapa | COORDINATE INFORMATION 7 |
| Ishikawa PA | ishikawa | COORDINATE INFORMATION 7 |
| Otsuki JCT | otsukijunction | COORDINATE INFORMATION 8 |
| Otsuki JCT | otsuki | COORDINATE INFORMATION 8 |

FIG. 17

| KEYWORD | ALTERNATIVE PRONUNCIATION |
|---|---|
| postoffice | () |
| street | () |
| interchange | (), (ic), (inter) |
| servicearea | (), (sa), (parking) |
| parkingarea | (), (pa), (parking) |
| junction | () |

(NOTE: () INDICATES THAT NO SOUND IS MADE FOR THE WORD)

SPEECH RECOGNITION APPARATUS AND SPEECH RECOGNITION NAVIGATION APPARATUS

INCORPORATION BY REFERENCE

The disclosures of the following priority applications are herein incorporated by reference:

Japanese Patent Application No. 11-255982 filed Sep. 9, 1999

Japanese Patent Application No. 11-255983 filed Sep. 9, 1999

Japanese Patent Application No. 11-255984 filed Sep. 9, 1999

Japanese Patent Application No. 2000-53257 filed Feb. 29, 2000

BACKGROUND OF THE INVENTION

1. Field of the Invention

The present invention relates to a voice recognition apparatus and a voice recognition navigation apparatus.

2. Description of the Related Art

There are car navigation apparatuses (hereafter referred to as navigation apparatuses) that display the current position of the vehicle, display a map over a wide area or in detail and provide guidance to the driver along the traveling direction over the remaining distance to the destination in the prior art. There are also voice recognition navigation apparatuses in the prior art having a function of enabling the driver engaged in driving to issue operating instructions by voice to improve driver safety (see Japanese Laid-Open Patent Publication No. 09-292255, for instance).

The voice recognition software program used in a voice recognition navigation apparatus normally judges that a speech has ended at a point in time at which there is no longer any speech after the start of a speech and calculates the correlation values between audio data obtained up to the point in time at which there is no longer any speech after the start of the speech and all the recognition words in the recognition dictionary. Then, the recognition word achieving the largest correlation value is judged to be the recognition results. Speech that needs to be recognized by a voice recognition navigation apparatus falls into various categories of words and phrases such as navigation commands (bird's eye view display, enlarge, reduce, etc.) used to issue instructions for various types of navigation operations, train stations, golf course names, hospital names and ski resort names.

Among these speeches, the golf course names, hospital names, ski resort names and the like tend to be longer than navigation commands and train station names, and are, therefore, extremely difficult to recognize.

In addition, the voice recognition software program normally calculates the correlation values between the audio data representing the speech made by the user (driver) after a TALK switch or the like is pressed, and the recognition words in the recognition dictionary. It then judges the recognition word achieving the largest correlation value to be the recognition results.

However, there is a problem in that the chance of erroneous recognition increases when the user starts his speech immediately after pressing the TALK switch.

Furthermore, the driver may become confused as to which instruction should be given to the navigation apparatus next and may utter a totally erroneous instruction speech. In such a case, too, the recognition word in the recognition dictionary achieving the largest correlation value is judged to be the instruction spoken by the driver and the navigation operation corresponding to that instruction is performed. For instance, let us consider a situation in which the driver, wishing to display a map, says "map" when there are only three recognition words, e.g., "audio," "television" and "bird's eye view display" provided in the recognition dictionary. In such a case, if the correlation value between the audio data and "television" is the largest, the navigation apparatus displays the television screen. As a result, a navigation operation other than that instructed by the driver is executed to confuse the driver.

There is another problem in that an erroneous recognition may occur if the user pronounces a given word in a slightly different manner or if the user employs an alternative expression.

SUMMARY OF THE INVENTION

A first object of the present invention is to provide a voice recognition apparatus and a voice recognition navigation apparatus capable of recognizing long speeches with ease and a high degree of reliability.

A second object of the present invention is to provide a voice recognition apparatus and a voice recognition navigation apparatus capable of achieving a successful voice recognition in a reliable manner even when a speech starts immediately after the TALK switch is pressed or when the actual pronunciation is slightly different from the standard pronunciation.

A third object of the present invention is to provide a voice recognition apparatus and a voice recognition navigation apparatus with which it is possible to ensure that none of the recognition words in the recognition dictionary is recognized if a word which is not provided in the recognition dictionary is spoken.

A fourth object of the present invention is to provide a voice recognition apparatus and a voice recognition navigation apparatus capable of achieving a successful voice recognition with a high degree of reliability even when the user pronounces part of the word or phrase in a manner slightly differently from the standard or if the user chooses an alternative word or phrase, and a recognition word generating method that may be adopted in the voice recognition apparatus and the voice recognition navigation apparatus.

Another object of the present invention is to provide a recording medium and a data signal in which data used in the apparatuses and a control program for controlling the apparatuses are provided.

In order to attain the above object, a voice recognition apparatus according to the present invention, comprises: a voice input device; a storage device that stores a recognition word indicating a pronunciation of a word to undergo voice recognition; and a voice recognition processing device that performs voice recognition processing by comparing audio data obtained through the voice input device and voice recognition data created in correspondence to the recognition word, and the storage device stores both a first recognition word corresponding to a pronunciation of an entirety of the word to undergo voice recognition and a second recognition word corresponding to a pronunciation of only a starting portion of a predetermined length of the entirety of the word to undergo voice recognition as recognition words for the word to undergo voice recognition.

In this voice recognition apparatus, it is preferred that when the pronunciation of the entirety of the word to undergo voice recognition extends over a first predetermined length, the storage device stores the second recognition word corresponding to a pronunciation of only a starting portion of a second predetermined length of the entirety of the word to undergo voice recognition as a recognition word for the word to undergo voice recognition.

A voice recognition navigation apparatus according to the present invention, comprises: a voice input device; a storage device that stores a recognition word indicating a pronunciation of a word to undergo voice recognition; and a voice recognition processing device that performs voice recognition processing by comparing audio data obtained through the voice input device and voice recognition data created in correspondence to the recognition word; a map information storage device that stores map information; and a control device that engages in control for providing route guidance based upon, at least, recognition results obtained by the voice recognition processing device and the map information, and the storage device stores both a first recognition word corresponding to a pronunciation of an entirety of the word to undergo voice recognition and a second recognition word corresponding to a pronunciation of only a starting portion of a predetermined length of the entirety of the word to undergo voice recognition as recognition words for the word to undergo voice recognition.

Another voice recognition apparatus according to the present invention, comprises: a voice input device; a storage device that stores a recognition word indicating a pronunciation of a word to undergo voice recognition; and a voice recognition processing device that performs voice recognition processing by comparing audio data obtained through the voice input device and voice recognition data created in correspondence to the recognition word, and the storage device stores a plurality of recognition words each having a different pronunciation, for a single word to undergo voice recognition.

Another voice recognition apparatus according to the present invention, comprises: a voice input device; a storage device that stores a recognition word indicating a pronunciation of a word to undergo voice recognition; and a voice recognition processing device that performs voice recognition processing by comparing audio data obtained through the voice input device and voice recognition data created in correspondence to the recognition word, and the storage device stores both a first recognition word corresponding to the pronunciation of an entirety of the word to undergo voice recognition and a second recognition word created by replacing the leading syllable in the pronunciation of the entirety of the word to undergo voice recognition with a vowel constituting the leading syllable, as recognition words for the word to undergo voice recognition.

In this voice recognition apparatus, it is preferred that: a generating device that generates the second recognition word based upon the first recognition word is further provided, and the storage device includes a first storage device and a second storage device; the first recognition word is stored in the first storage device in advance; and the second recognition word is generated by the generating device and stored in the second storage device when the voice recognition processing device performs voice recognition processing.

Another voice recognition apparatus according to the present invention, comprises: a voice input device; a storage device that stores a recognition word indicating a pronunciation of a word to undergo voice recognition; and a voice recognition processing device that performs voice recognition processing by comparing audio data obtained through the voice input device and voice recognition data created in correspondence to the recognition word, and the storage device stores both a first recognition word corresponding to the pronunciation of an entirety of the word to undergo voice recognition and a second recognition word created by deleting a starting portion of a predetermined length of the pronunciation of the entirety of the word to undergo voice recognition, as recognition words for the word to undergo voice recognition.

In this voice recognition apparatus, it is preferred that: a generating device that generates the second recognition word based upon the first recognition word is further provided; the storage device includes a first storage device and a second storage device; the first recognition word is stored in the first storage device in advance; and the second recognition word is generated by the generating device and stored in the second storage device when the voice recognition processing device performs voice recognition processing.

Another voice recognition navigation apparatus according to the present invention, comprises: a voice input device; a storage device that stores a recognition word indicating a pronunciation of a word to undergo voice recognition; a voice recognition processing device that performs voice recognition processing by comparing audio data obtained through the voice input device and voice recognition data created in correspondence to the recognition word; a map information storage device that stores map information; and a control device that engages in control for providing route guidance based upon, at least, recognition results obtained by the voice recognition processing device and the map information, and the storage device stores a plurality of recognition words each having a different pronunciation, for a single word to undergo voice recognition.

Another voice recognition apparatus according to the present invention, comprises: a voice input device; a storage device that stores recognition words to be used in voice recognition processing; and a voice recognition processing device that performs voice recognition processing by comparing audio data obtained through the voice input device and voice recognition data generated based upon the recognition words, and: the storage device stores valid recognition words corresponding to pronunciations of words to undergo voice recognition and invalid recognition words each indicating a pronunciation that is dissimilar to the pronunciations of the words to undergo voice recognition; and when the audio data obtained through the voice input device manifests a highest similarity to voice recognition data generated based upon one of the invalid recognition words, the voice recognition processing device decides that none of the words to undergo voice recognition has been recognized.

In this voice recognition apparatus, it is preferred that in case that words to undergo voice recognition are classified into a plurality of groups, words in one group are undergoing voice recognition and words in another group are not undergoing voice recognition, the invalid recognition words in the one group are created based upon valid recognition words in the other group.

Another voice recognition apparatus according to the present invention, comprises: a voice input device; a storage device that stores recognition words to be used in voice recognition processing; a voice recognition processing device that performs voice recognition processing by comparing audio data obtained through the voice input device and voice recognition data generated based upon the recognition words; a map information storage device that stores map information; and a control device that engages in control for providing route guidance based upon, at least, voice recognition results obtained by the voice recognition processing device and the map information, and: the storage device stores valid recognition words corresponding to pronunciations of words to undergo voice recognition and invalid recognition words each indicating a pronunciation that is dissimilar to the pronunciations of the words to undergo voice recognition; and when the audio data obtained through the voice input device manifests a highest similarity to voice recognition data generated based upon one of the invalid recognition words, the voice recognition processing device decides that none of the words to undergo voice recognition has been recognized.

Another voice recognition apparatus according to the present invention, comprises: a voice input device; a storage device that stores a recognition word indicating a pronunciation of a word to undergo voice recognition; and a voice recognition processing device that performs voice recognition processing by comparing audio data obtained through the voice input device and voice recognition data created in correspondence to the recognition word, and when a given word to undergo voice recognition includes a predetermined specific word as a part of the given word, a first recognition word created by replacing a standard pronunciation of the specific word with an alternative pronunciation of the specific word different from the standard pronunciation is stored in the storage device.

In this voice recognition apparatus, it is preferred that: the specific word is a word that is a common part of a plurality of words to undergo voice recognition; and the alternative pronunciation to the standard pronunciation of the specific word indicates how the specific word is pronounced in everyday life.

Also, it is preferred that the storage device stores both a standard recognition word containing the standard pronunciation of the specific word and the first recognition word, for the given word to undergo voice recognition. In this case, it is preferred that the alternative pronunciation to the standard pronunciation of the specific word in the first recognition word is constituted of no sound made for the specific word. Or it is preferred that the alternative pronunciation to the standard pronunciation of the specific word in the first recognition word is constituted of a pronunciation corresponding to an alternative term or an abbreviated term for the specific word.

Also, it is preferred that a generating device that generates the first recognition word and stores the first recognition word in the storage device is further provided when the voice recognition processing device performs voice recognition processing on the word to undergo voice recognition containing the specific word as a part the word to undergo voice recognition.

Another voice recognition apparatus according to the present invention, comprises: a voice input device; a storage device that stores a recognition word indicating a pronunciation of a word to undergo voice recognition; and a voice recognition processing device that performs voice recognition processing by comparing audio data obtained through the voice input device and voice recognition data created in correspondence to the recognition word, and: if a predetermined specific word is not included in the word to undergo voice recognition, a recognition word created by adding a pronunciation of the specific word in the storage device stores.

Another voice recognition navigation apparatus according to the present invention, comprises: a voice input device; a storage device that stores a recognition word indicating a pronunciation of a word to undergo voice recognition; a voice recognition processing device that performs voice recognition processing by comparing audio data obtained through the voice input device and voice recognition data created in correspondence to the recognition word; a map information storage device that stores map information; and a control device that engages in control for providing route guidance based upon, at least, recognition results obtained by the voice recognition processing device and the map information, and: when a given word to undergo voice recognition includes a predetermined specific word as a part of the given word, a first recognition word created by replacing a standard pronunciation of the specific word with an alternative pronunciation different from the standard pronunciation is stored in the storage device.

Another voice recognition navigation apparatus according to the present invention, comprises: a voice input device; a storage device that stores a recognition word indicating a pronunciation of a word to undergo voice recognition; a voice recognition processing device that performs voice recognition processing by comparing audio data obtained through the voice input device and voice recognition data created in correspondence to the recognition word; a map information storage device that stores map information; and a control device that engages in control for providing route guidance based upon, at least, recognition results obtained by the voice recognition processing device and the map information, and: if a predetermined specific word is not included in the word to undergo voice recognition, a recognition word created by adding a pronunciation of the specific word is stored in the storage device.

A method of recognition word generation through which recognition words indicating pronunciations of words to undergo voice recognition used to generate voice recognition data to be compared against audio data obtained through a voice input device are generated, comprises: a step in which when a given word to undergo voice recognition contains a predetermined specific word as a part of the given word, a recognition word is created by replacing a standard pronunciation of the specific word with a alternative pronunciation different from the standard pronunciation.

A recording medium according to the present invention stores data representing recognition words corresponding to a word to undergo voice recognition that is used to generate voice recognition data to be compared against audio data obtained through a voice input device in voice recognition processing. The data comprises: a first recognition word corresponding to a pronunciation of an is entirety of the word to undergo voice recognition; and a second recognition word corresponding to a pronunciation of only a starting portion of a predetermined length of the entirety of the word to undergo voice recognition, and both the first recognition word and the second recognition word are used as recognition words for the word to undergo voice recognition.

A data signal according to the present invention that is transmitted in a communication line comprises data representing recognition words corresponding to a word to undergo voice recognition that is used to generate a voice recognition data to be compared against audio data obtained through a voice input device in voice recognition processing. The data comprises: a first recognition word corresponding to a pronunciation of an entirety of the word to undergo voice recognition; and a second recognition word corresponding to a pronunciation of only a starting portion of a predetermined length of the entirety of the word to undergo voice recognition, and both the first recognition word and the second recognition word are used as recognition words for the word to undergo voice recognition.

Another recording medium according to the present invention stores data representing recognition words corresponding to a word to undergo voice recognition that is used to generate voice recognition data to be compared against audio data obtained through a voice input device in voice recognition processing. The data comprises: a first recognition word corresponding to a pronunciation of an entirety of the word to undergo voice recognition; and a second recognition word created by replacing a leading syllable in the pronunciation of the entirety of the word to undergo voice recognition with a vowel constituting the leading syllable, and both the first recognition word and the second recognition word are used as recognition words for the word to undergo voice recognition.

Another data signal according to the present invention transmitted in a communication line comprises data representing recognition words corresponding to a word to undergo voice recognition that is used to generate a voice recognition data to be compared against audio data obtained through a voice input device in voice recognition processing. The data comprises: a first recognition word corresponding to a pronunciation of an entirety of the word to undergo voice recognition; and a second recognition word created by replacing a leading syllable in the pronunciation of the entirety of the word to undergo voice recognition with a vowel constituting the leading syllable, and both the first recognition word and the second recognition word are used as recognition words for the word to undergo voice recognition.

Another recording medium according to the present invention stores data representing recognition words corresponding to a word to undergo voice recognition that is used to generate voice recognition data to be compared against audio data obtained through a voice input device in voice recognition processing. The data comprises: a first recognition word corresponding to a pronunciation of an entirety of the word to undergo voice recognition; and a second recognition word created by deleting a starting portion of a predetermined length of the pronunciation of the entirety of the word to undergo voice recognition, and both the first recognition word and the second recognition word are used as recognition words for the word to undergo voice recognition.

Another data signal according to the present invention transmitted in a communication line comprises data representing recognition words corresponding to a word to undergo voice recognition that is used to generate a voice recognition data to be compared against audio data obtained through a voice input device in voice recognition processing. The data comprises: a first recognition word corresponding to a pronunciation of an entirety of the word to undergo voice recognition; and a second recognition word created by deleting a starting portion of a predetermined length of the pronunciation of the entirety of the word to undergo voice recognition, and both the first recognition word and the second recognition word are used as recognition words for the word to undergo voice recognition.

Another recording medium according to the present invention stores a voice recognition control program. The voice recognition control program comprises: an instruction in which audio data generated based upon a voice that has been input are compared with voice recognition data generated based upon valid recognition words corresponding to words to undergo voice recognition and indicating pronunciations of the words or invalid recognition words each indicating a pronunciation dissimilar to the pronunciations of all the words to undergo voice recognition; and an instruction in which it is decided that none of the words to undergo voice recognition has been recognized if the audio data manifest a highest similarity to voice recognition data generated based upon one of the invalid recognition words as comparison results.

Another data signal according to the present invention transmitted in a communication line comprises a voice recognition control program. The voice recognition control program comprises: an instruction in which audio data generated based upon a voice that has been input are compared with voice recognition data generated based upon valid recognition words corresponding to words to undergo voice recognition and indicating pronunciations of the words or invalid recognition words each indicating a pronunciation dissimilar to the pronunciations of all the words to undergo voice recognition; and an instruction in which it is decided that none of the words to undergo voice recognition has been recognized if the audio data manifest a highest similarity to voice recognition data generated based upon one of the invalid recognition words as comparison results.

Another recording medium according to the present invention stores a recognition word generating program for generating recognition words indicating pronunciations of words to undergo voice recognition used to generate voice recognition data to be compared against audio data obtained through a voice input device in voice recognition processing. The recognition word generating program comprises: an instruction in which, if a given word to undergo voice recognition includes a predetermined specific word as a part of the given word, a recognition word is generated by replacing a standard pronunciation of the specific word with an alternative pronunciation of the specific word different from the standard pronunciation.

Another data signal according to the present invention transmitted in a communication line comprises a recognition word generating program for generating recognition words indicating pronunciations of words to undergo voice recognition used to generate voice recognition data to be compared against audio data obtained through a voice input device in voice recognition processing. The recognition word generating program comprises: an instruction in which, if a given word to undergo voice recognition includes a predetermined specific word as a part of the given word, a recognition word is generated by replacing a standard pronunciation of the specific word with an alternative pronunciation of the specific word different from the standard pronunciation.

Another recording medium according to the present invention stores data representing recognition words indicating pronunciations of words to undergo voice recognition used to create voice recognition data to be compared against audio data obtained through a voice input device in voice recognition processing. The data comprises, when a given word to undergo voice recognition includes a predetermined specific word as a part the given word, a recognition word created by replacing a standard pronunciation of the specific word with an alternative pronunciation of the specific word different from the standard pronunciation Another data signal according to the present invention transmitted in a communication line comprises data representing recognition words indicating pronunciations of words to undergo voice recognition used to create voice recognition data to be compared against audio data obtained through a voice input device in voice recognition processing. The data comprises, when a given word to undergo voice recognition includes a predetermined specific word as a part the given word, a recognition word created by replacing a standard pronunciation of the specific word with an alternative pronunciation of the specific word different from the standard pronunciation

BRIEF DESCRIPTION OF THE DRAWINGS

FIG. 1 illustrates the structure of the car navigation system according to the present invention;

FIG. 2 shows a recognition dictionary which has not undergone the improvement in a first embodiment;

FIG. 3 shows a recognition dictionary having undergone the improvement in the first embodiment;

FIG. 5 shows a recognition dictionary having undergone the improvement in a second embodiment;

FIG. 6 shows an instruction dictionary in a third embodiment;

FIG. 7 presents a flowchart of the control for implementing voice recognition in the third embodiment;

FIG. 8 shows the recognition dictionary with the standard pronunciation in a fourth embodiment;

FIG. 9 shows a new recognition dictionary created in the fourth embodiment;

FIG. 14 shows a keyword and an alternative pronunciation used to explain the fifth embodiment;

FIGS. 15A~15C show standard pronunciation recognition dictionaries in a sixth embodiment;

FIGS. 16A~16C show new recognition dictionaries created in the sixth embodiment;

FIG. 17 presents a list of keywords and alternative expressions used to explain the sixth embodiment;

DESCRIPTION OF THE PREFERRED EMBODIMENTS

First Embodiment

Figure 4:
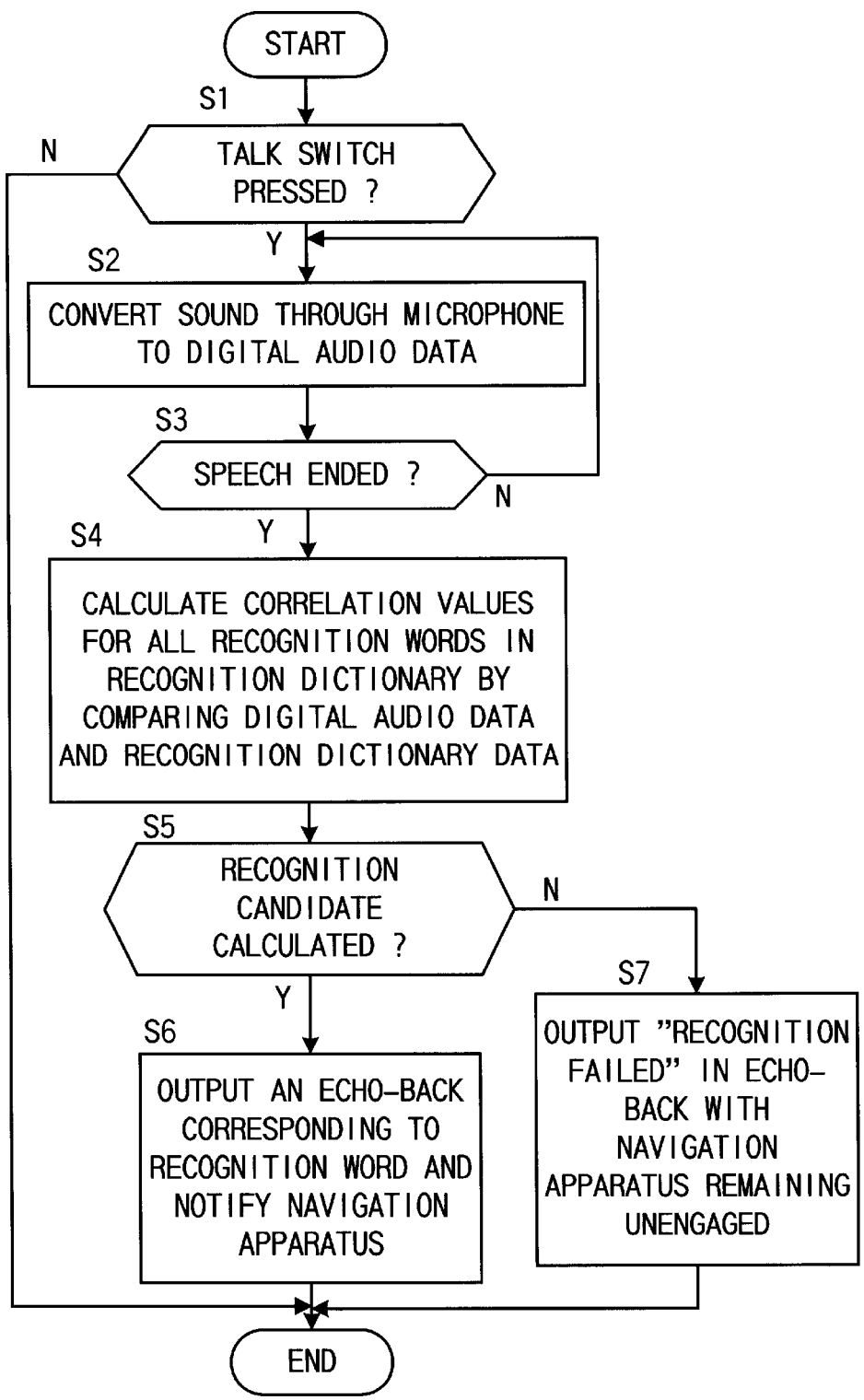
FIG. 4 presents a flowchart of the control for implementing voice recognition in the first embodiment.

FIG. 1 shows the structure adopted by the car navigation system in the first embodiment of the present invention. The car navigation system comprises a navigation apparatus 100 and a voice unit 200. In the navigation system in the first embodiment, successful voice recognition is achieved with a high degree of reliability even when the name of destination facility is long.

The navigation apparatus 100 comprises a GPS receiver 101, a gyro sensor 102, a vehicle speed sensor 103, a driver 104, a CPU 105, a RAM 106, a ROM 107, a CD-ROM drive 108, a display device 109, a bus line 110 and the like.

The voice unit 200 comprises a microphone 201, an A/D conversion unit 202, a D/A conversion unit 203, an amplifier 204, a speaker 205, a TALK switch 206, a driver 207, a CPU 208, a RAM 209, a ROM 210, a bus line 212 and the like. The navigation apparatus 100 and the voice unit 200 are connected with each other via a communication line 211.

The GPS receiver 101 receives a signal from a GPS (Global Positioning System) satellite and detects the absolute position and the absolute bearing of the vehicle. The gyro sensor 102, which may be constituted of, for instance, a vibrating gyro, detects the yaw angle speed of the vehicle. The vehicle speed sensor 103 detects the distance traveled by the vehicle based upon the number of pulses output each time the vehicle has traveled over a specific distance. The two dimensional movement of the vehicle is detected by the gyro sensor 102 and the vehicle speed sensor 103. The driver 104 is provided to connect signals from the GPS receiver 101, the gyro sensor 102 and the vehicle speed sensor 103 with the bus line 110. In other words, the outputs from the individual sensors are converted to data that can be read by the CPU 105.

The CPU 105 controls the entire navigation apparatus 100 by executing a program stored in the ROM 107. In the RAM 106, which is constituted of volatile memory, a work data area is secured. In the ROM 107 constituted of non volatile memory, the control program mentioned above and the like are stored. The CD-ROM drive 108 uses a CD-ROM as a recording medium to store road map information such as vector road data and the like. The CD-ROM drive may be alternatively constituted of another recording device such as a DVD drive which uses a DVD as a recording medium. The display device 109 displays a road map that contains the current position and the surrounding area of the vehicle, route information indicating the route to the destination, the intersection information indicating the next intersection to which the vehicle is to be guided and the like. It may be constituted of, for instance, a liquid crystal display device or a CRT. The bus line 110 is provided to connect the components of the navigation apparatus 100 such as the CPU 105 via a bus.

The voice unit 200 performs voice-related processing such as voice recognition and voice synthesis. The TALK switch 206 is pressed by the user to give an instruction for a start of voice recognition. Audio data are input via the microphone 201 over a specific period of time after the TALK switch 206 is pressed. The sound thus input is converted to digital audio data by the A/D conversion unit 202 and the driver 207.

In the ROM 210 of the voice unit 200, a voice recognition software program, a voice synthesis software program, voice recognition dictionaries (hereafter simply referred to as recognition dictionaries), a voice synthesis dictionary (hereafter simply referred to as a synthesis dictionary) and the like are stored. In the voice recognition software program, correlation values between the digital audio data and all the recognition words in a recognition dictionary are calculated and the recognition word achieving a largest correlation value is determined to be the recognition results. In the voice synthesis program, data needed to output a specified phrase through the speaker are calculated. Since both software programs are of the known art, their detailed explanation is omitted.

A recognition dictionary is constituted of a set of data compiled with a plurality of words and phrases to be used in voice recognition. More specifically, pronunciation data corresponding to individual words specified with Hiragana, Katakana, Roman characters or phonetic symbols (the corresponding character codes, in reality) are stored in the recognition dictionary. The words and phrases stored in the recognition dictionary are referred to as recognition words. The character data corresponding to the recognition word and information such as the corresponding coordinate information if the recognition word represents a facility name as well as the pronunciation data are attached to each recognition word. Details of the recognition dictionaries are to be given later. In the synthesis dictionary, sound source data and the like necessary for voice synthesis are stored.

When a speech is completed, the CPU 208 executes the voice recognition software program by using the RAM 209, the ROM 210 and the like to perform a voice recognition of the digital audio data. The voice recognition software program references the pronunciation data (data specified in Hiragana, Katakana or Roman characters) of the recognition words in the recognition dictionary to generate the voice recognition data corresponding to the recognition words and calculates the correlation values between the voice recognition data and the digital audio data. It calculates the correlation values between all the recognition words and the digital audio data and determines the recognition word achieving the highest correlation value which is also equal to or larger than a specific value before ending the voice recognition. The echo-back word linked to the recognition word is then converted to special speech data by using the voice synthesis software program. Then, the CPU 208 engages the D/A conversion unit 203, the amplifier 204 and the speaker 205 to output the recognition results through echo-back.

If all the correlation values thus calculated are equal to or smaller than the specific value, the CPU 208 decides that voice recognition has failed and thus no navigation operation is executed. More specifically, it may sound a beep indicating that a voice recognition attempt has failed or it may sound a response echo-back such as "recognition failed." The bus line 212 is provided for the voice unit 200.

Next, the recognition dictionaries are explained in detail. FIG. 2 shows a golf course name recognition dictionary in which the recognition words corresponding to three golf course names are stored. The recognition words are each constituted of the pronunciation data for a given facility name (golf course name in the example presented in FIG. 2). While the recognition words in FIG. 2 are presented in English spelling to facilitate the explanation, in reality, the character codes corresponding to the phonetic symbols (pronunciation symbols) of the recognition words are stored. Additional information is attached to each recognition word.

The additional information includes various types of information such as the coordinate information indicating the coordinates of the facility on the map, the number assigned to the recognition dictionary to be read next, attribute information indicating various attributes of the facility and display character data for the facility name. In FIG. 2, only the coordinate information is shown as an example. It is to be noted that the pronunciation data do not need to be constituted of phonetic symbols. In an phonogramic language system, the spelling of a given word for voice recognition directly constitutes the pronunciation data. The pronunciation data may be stored in a different method as well. In other words, any method may be adopted as long as the pronunciation of words to undergo recognition can be indicated.

Next, the high risk of failure in recognizing a long golf course name (word) is analyzed in reference to the example presented in FIG. 2 showing the golf course name recognition dictionary. For instance, let us assume that the user says (vocalizes) the first golf course name "Japanese Country Club" in FIG. 2 for voice recognition. Not all users say such a long name all at once. There may be users who say the golf course name by pausing in the middle. For instance, let us assume that the user pauses after saying "Japanese" and then continues "Country Club." If the pause is short, the voice recognition software program handles the audio data corresponding to "Japanese Country Club" as a single input. Thus, a correct recognition is achieved and no problem occurs.

However, the voice recognition software program will normally decide that a speech has ended at the point in time at which there is no longer a speech following the start of the speech. If a long pause is allowed to elapse in the middle of the speech, the program will decide that the speech has ended at the point in time at which the pause occurs and, as a result, the speech data corresponding to the speech resumed after the pause will be discarded. In other words, only the audio data corresponding to "Japanese" will be used as the input. As a result, the chance of an erroneous recognition becomes extremely high especially if there are numerous similar words.

In conformance with the observation made with respect to the analysis above, the golf course name recognition dictionary in FIG. 2 is handled as explained below in the first embodiment. It is likely that when saying "Japanese Country Club," most users would place a slight pause between "Japanese" and "Country Club." Accordingly, a shorter recognition word, i.e., "Japanese," to correspond to "Japanese Country Club," is added. The same additional information, i.e., the coordinate information 1, as that for "Japanese Country Club" is attached to the shorter recognition word. A recognition word representing a given phrase spoken in a different manner that is provided in correspondence to the standard recognition word as in this case is referred to as an "alternative word." FIG. 3 presents an example in which alternative words are added to the golf course name recognition dictionary in FIG. 2. "japanese," "kanagawa" and "abc" are respectively added as alternative words for "Japanese Country Club," "Kanagawa Country Club" and "ABC Country Club" and are stored in a single recognition dictionary.

For instance, even if the sound corresponding to "abc" alone is input as a result of a pause when saying "ABC Country Club," successful recognition is achieved since the short recognition word "abc" is provided. By providing an alternative word constituted of the portion preceding a likely pause in the standard recognition word for a long word or phrase and adding the alternative word in the recognition dictionary, a successful recognition is achieved with a high degree of reliability even when the user pauses in the middle of the speech. While this results in a disadvantage in that the capacity of the recognition dictionary must be increased and the time required for recognition execution becomes longer, a major advantage is achieved in that the likelihood of an erroneous recognition occurring due to a pause in the case of a long facility name is reduced with a high degree of reliability.

It is to be noted that alternative words may be selectively provided only for long phrases having or exceeding a specific length. In addition, they may be selectively provided only for phrases that are known through experience to be likely to have a pause, regardless of the actual length of the phrase. Furthermore, a plurality of alternative words with varying lengths may be provided for a given standard recognition word.

The cutoff point for creating a shorter alternative word should be set at the point where a pause is known in advance through testing or experience to be most likely to occur. Alternatively, since a long word is normally constituted of a plurality of shorter words, the cutoff point may be set at the position after the short word closest to the point exactly halfway through the entire spoken expression. Or it may be unconditionally set at the point after the short word at a specific position counting from the beginning of the phrase. Furthermore, the cutoff point may be unconditionally set at the point following the syllable at a specific position counting from the beginning.

FIG. 4 is a flowchart of the control for implementing voice recognition on the voice unit 200. The control program, which is stored in the ROM 210, is executed by the CPU 208. This routine starts when the power to the navigation apparatus 100 and the voice unit 200 is turned on.

In step S1, a decision is made as to whether or not the TALK switch 206 has been pressed, and if it is decided that the TALK switch 206 has been pressed, the operation proceeds to step S2. If it is decided, on the other hand, that the TALK switch 206 has not been pressed, the routine ends. After pressing the TALK switch 206, the user says (vocalizes), for instance, one of the golf course names shown in FIG. 2 within a specific period of time. In step S2, the audio signal provided through the microphone 201 is converted to digital audio data. In step S3, a decision is made as to whether or not the speech has ended. A speech is judged to have ended if the audio signal lapses over a specific length of time. If it is decided that the speech has ended, the operation proceeds to step S4, whereas if it is decided that the speech has not ended yet, the operation returns to step S2.

In step S4, the correlation values between the digital audio data obtained in step S2 and all the recognition words in the recognition dictionary in FIG. 3 are calculated and then the operation proceeds to step S5. The recognition dictionary in FIG. 3 created by adding alternative words to the recognition dictionary in FIG. 2 is utilized in this process. In step S5, a decision is made as to whether or not the largest correlation value among the calculated correlation values is equal to or larger than a specific value. If the largest correlation value is determined to be equal to or larger than the specific value, it is assumed that the word has been recognized before the operation proceeds to step S6. In step S6, the recognition word achieving the largest correlation value is echoed back by voice.

In addition, in step S6, the navigation apparatus 100 is notified that the golf course name (facility name) has been recognized, before ending the processing. The notification to the navigation apparatus 100 is made by providing the character information and the coordinates on the map constituting the additional information. The navigation apparatus 100 displays the road map of the area around the facility on the display device 109 based upon the coordinate data corresponding to the golf course (facility) on the map transmitted via the communication line 211, the map information at the CD-ROM drive 108 and the like.

If, on the other hand, the largest correlation value is determined to be smaller than the specific value in step S5, it is assumed that the spoken word has not been recognized and the operation proceeds to step S7. In step S7, "recognition failed" is echoed back by voice, before ending the processing. No processing is performed by the navigation apparatus 100, either.

As described above, a recognition dictionary created by adding alternative words is utilized for voice recognition. As a result, even if the user pauses in the middle when saying a long facility name or the like, a successful voice recognition of the long facility name is achieved with a high degree of reliability.

Second Embodiment

In the car navigation system in the second embodiment, a successful voice recognition is achieved with a high degree of reliability even when the user speaks immediately after pressing the TALK switch. Since the car navigation system in the second embodiment is structured identically to the car navigation system in the first embodiment shown in FIG. 1, its explanation is omitted.

Since the recognition dictionary used in the second embodiment differs from that in the first embodiment, the recognition dictionary in the second embodiment is explained below. The basic structure of the recognition dictionary is similar to that in the first embodiment.

First, the high risk of failure in recognition that tends to occur when the user speaks immediately after pressing the TALK switch 206 is analyzed by using the golf course name recognition dictionary presented in FIG. 2 illustrating the first embodiment as an example.

The voice recognition software program normally calculates the correlation values between the audio data of the speech made by the user after he presses the TALK switch 206 and all the recognition words in the recognition dictionary. Then, the recognition word achieving the largest correlation value is judged to be the recognition results. The voice recognition software program requires a slight preparation period after the TALK switch 206 is pressed before it is ready to accept a voice input via the microphone 201. Thus, if the user speaks immediately after pressing the TALK switch 206, a portion of the beginning of the spoken word or phrase may be lost. For instance, if a golf course name "Japanese Country Club" is spoken immediately after pressing the TALK switch 206, the consonant "J" at the beginning may be cut off and a word that sounds like "Apanese Country Club" may be input. In such a case, the likelihood of erroneous recognition becomes extremely high particularly if there are many similar words or phrases in the dictionary.

Based upon the analysis above, the golf course name recognition dictionary in FIG. 2 is handled as explained below in the second embodiment. Let us now consider the situation in which the first sound "J" in the recognition word representing the golf course name "Japanese Country Club" is not picked up. In this situation, the word may sound like "Apanese Country Club" as described earlier. Accordingly, a recognition word with the consonant "J" at the beginning missing, i.e., "apanesecountryclub" is added to the recognition dictionary. The same additional information as that for the standard "japanesecountryclub" is attached to the added recognition word. As a result, even when "japanesecountryclub" is spoken immediately after pressing the TALK switch 206 and the first consonant is not picked up, a successful voice recognition is achieved with a high degree of reliability. It is to be noted that a recognition word spoken in a way that sounds slightly different that is provided in correspondence to a given standard recognition word is referred to as an alternative word.

In addition, let us consider a case in which "A" at the beginning of the recognition word representing the golf course name "ABC Country Club" is not picked up. In such a situation, the recognition word may sound like "BC Country Club." Accordingly, an alternative word to the recognition word created by deleting "A" at the beginning, i.e., "BC Country Club" is added to the recognition dictionary. The alternative word is assigned with the same additional information as that of the standard "ABC Country Club." As a result, even when "ABC Country Club" is spoken immediately after pressing the TALK switch 206 and "A" at the beginning is not picked up, a successful voice recognition is achieved with a high degree of reliability.

FIG. 5 presents an example of a golf course name dictionary created by adding alternative words to the golf course name dictionary in FIG. 2. The rules in conformance to which alternative words may be created include, for instance, consonant+vowel at the beginning of the word replaced with the vowel alone, a specific number of characters counting from the beginning of the word deleted, the first character at the beginning alone deleted and a vowel deleted only when the vowel is at the beginning of the word. In addition, alternative words representing typical sounds likely to be picked up if the user speaks immediately after pressing the TALK switch 206 may be ascertained through testing or experience and added. It is to be noted that the term "character" as used in this context as in the "character at the beginning" refers to a single syllable. For instance, one syllable may be constituted of a vowel alone, a consonant alone or a consonant and a vowel.

Since the flowchart of the control for implementing voice recognition in the second embodiment is identical to that presented in FIG. 4 illustrating the first embodiment except for the recognition dictionary that is used, its explanation is omitted. The recognition dictionary used in the second embodiment is the recognition dictionary created by adding the alternative words as shown in FIG. 5.

As described above, alternative words each created by deleting the first character or the first several characters in the standard recognition word or by replacing the first character with a vowel are added to the recognition dictionary. As a result, even when the user starts speaking immediately after turning on the TALK switch 206, a successful voice recognition of the word is achieved with a high degree of reliability.

It is to be noted that while an example given above is of a recognition dictionary in English, the language is not limited to English. The present invention may be adopted in any other language including Japanese.

Third Embodiment

In the car navigation system in the third embodiment, it is ensured with a high degree of reliability that if a word not included in the recognition dictionary is spoken, it is not recognized as any of the recognition words in the recognition dictionary. Since the structure adopted in the car navigation system in the third embodiment is identical to that of the car navigation system in the first embodiment illustrated in FIG. 1, its explanation is omitted.

Since the recognition dictionary used in the third embodiment is different from the recognition dictionary in the first embodiment, its explanation is given below. FIG. 6 shows an instruction phrase dictionary used in this embodiment. In this dictionary, recognition words related to three valid instruction phrases and three invalid instruction phrases are stored. Each recognition word is constituted of pronunciation data corresponding to a given instruction phrase. While the recognition words in FIG. 6 are presented in English spelling to facilitate the explanation, the character codes corresponding to the phonetic symbols (pronunciation symbols) of the recognition words are stored in reality. Additional information is attached to each recognition word. Various types of information such as the code for identifying the instruction phrase, the display character data corresponding to the instruction phrase and a valid/invalid classification is stored as the additional information. FIG. 6 only shows the valid/invalid classification information as an example.

Instruction phrases are used to give instructions to the navigation apparatus. In the example presented in FIG. 6, there are three valid instruction phrases, i.e., "Audio", "TV (television)" and "Bird View (Bird's eye view display)." "Audio" is an instruction phrase spoken by the user when he wishes to utilize the navigation system as an audio apparatus such as a car stereo. "TV" is an instruction phrase spoken by the user when he wishes to utilize the navigation system as a television. "Bird View" is an instruction phrase spoken by the user when he wishes to bring up a bird's eye view display (three-dimensional display) of a map in the navigation system.

"Cup", "New York" and "Hawaii" a recognition words registered as invalid words. An invalid word refers to a recognition word having voice recognition data that are dissimilar to the voice recognition data of all the valid instruction phrases. If one of the invalid words is recognized as most similar to the spoken phrase through voice recognition, it means that the spoken phrase has not been recognized as a valid instruction phrase. Consequently, the navigation apparatus 100 does not engage in any processing. Alternatively, it may display a warning indicating that voice recognition has failed. While details of the method for selecting such invalid words are to be given later, it is assumed at this point that the three invalid words above are selected and stored.

Let us assume that the current navigation operation is in a state in which only the three instructions "Audio," "TV" and "Bird View," are accepted with the instruction phrase dictionary in FIG. 6 open in the RAM 209. At this point, the user speaks an instruction phrase "Map" attempting by mistake to display a map on the display device 109. The instruction phrase "Map" is not accepted in the current navigation operation. The voice recognition software program performs voice recognition processing by calculating the correlation values between the digital audio data of the instruction phrase "Map" obtained via the microphone 201 and all the recognition words in the instruction phrase dictionary. In this case, the correlation value between the digital audio data and "Cup" having a similar pronunciation to that of "Map" is the highest and, as a result, "Cup" is returned as the voice recognition result. However, since "Cup" is registered as an invalid word, the navigation apparatus 100 does not engage in any processing, assuming that voice recognition of the instruction has failed. Alternatively, it may display or sound a corresponding warning.

Next, the method for selecting invalid words is explained. Any of various methods may be employed to select invalid words. An invalid word refers to a recognition word having voice recognition data dissimilar to the voice recognition data of all the valid instruction phrases, as explained earlier. In addition, it is most desirable to select invalid words by ensuring that when an instruction phrase other than any of the valid instruction phrases is spoken, the correlation value between the spoken instruction phrase and one of the invalid words always achieves the largest value equal to or larger than a specific value. However, since it is not possible to foresee what words other than the valid instruction phrases the user is to speak, invalid words satisfying the conditions outlined above can be selected only from the range of words assumed likely to be spoken by the user.

Selection Method 1

A word that does not contain any the first syllables of the valid words in its first syllable is used for an invalid word. When "o", "t" and "ba" respectively indicate the first syllables of the valid words in the example above, invalid words are those that do not contain "o", "t" or "ba" in their first syllables.

Selection Method 2

When there is a group of instruction phrases valid only in a given menu screen and there is another group of instruction phrases valid in another menu screen, the other group of instruction phrases valid in the other menu screen but not valid in the given menu screen are directly assigned as invalid words. In this situation, all the instruction phrases in the other group may be selected as invalid words or only some of the instruction phrases in the other group may be selected as invalid words. In the example, "Map" is directly stored as an invalid word, since the user may be more likely to give an erroneous instruction without knowing exactly what instruction phrases are valid in a given navigation operation screen than to speak a totally random word. It is to be noted that in this selection method, too, a word with voice recognition data similar to those of a valid instruction phrase should not be selected as an invalid word, since it would create the possibility that a valid instruction phrase could be erroneously recognized as an invalid word.

Selection Method 3

Words other than valid instruction phrases that are known through experience to be likely to be spoken by the user in the navigation apparatus may be accumulated. Those words may then be stored as invalid words. In this case, too, a word having voice recognition data similar to those of valid instruction should not be selected as invalid words.

Selection Method 4

A word having vowels arranged differently from a valid instruction phrase is selected as an invalid word. The arrangement of vowels as referred to in this context may be the arrangement of pronunciation symbols equivalent to vowels.

Selection Method 5

Another recognition dictionary is prepared as appropriate, an experiment is then conducted to calculate the correlation values between all the spoken valid instruction words and the recognition words in the other recognition dictionary and the recognition words that do not achieve correlation values equal to or higher than a specific value are selected as invalid words. In other words, recognition words with correlation values equal to or lower than the specific value are selected as invalid words. For instance, a navigation system may be provided with the various facility name dictionaries with recognition words indicating ski resort names and station names. An appropriate facility name dictionary among those may be used to select the facility names indicating correlation values equal to or lower than a specific value relative to the spoken instruction words mentioned above as invalid words. In this case, while it has not been confirmed that when a word other than a valid instruction phrase is spoken, the correlation value relative to a recognition word selected as an invalid word always achieves the largest value equal to or higher than a specific value, the likelihood of this is fairly high, and therefore, this is an effective method.

It is to be noted that the selection methods that may be adopted in the present invention are not limited to those explained above. The present invention may adopt any method as long as invalid words can be selected by satisfying the conditions outlined earlier. In addition, invalid words may be selected in an effective manner by combining some of the methods explained above.

Next, the control flow of the voice recognition processing is explained. FIG. 7 is a flowchart of the control for implementing voice recognition on the voice unit 200. The control program, which is stored in the ROM 210, is executed by the CPU 208. This routine starts when the power to the navigation apparatus 100 and the voice unit 200 is turned on.

In step S101, a decision is made as to whether or not the TALK switch 206 has been pressed, and if it is decided that the TALK switch 206 has been pressed, the operation proceeds to step S102. If it is decided, on the other hand, that the TALK switch 206 has not been pressed, the routine ends. After pressing the TALK switch 206, the user says "Bird View," for instance, in FIG. 6 within a specific period of time. In step S102, the audio signal obtained through the microphone 201 is converted to digital audio data. In step S103, a decision is made as to whether or not the speech has ended. A speech is judged to have ended if the audio signal lapses over a specific length of time. If it is decided that the speech has ended, the operation proceeds to step S104, whereas if it is decided that the speech has not ended yet, the operation returns to step S102.

In step S104, the correlation values between the digital audio data obtained in step S102 and all the recognition words in the recognition dictionary in FIG. 6 are calculated and the operation proceeds to step S105. In step S105, a decision is made as to whether or not the largest correlation value among the correlation values thus calculated is equal to or larger than a specific value and the corresponding recognition word is a valid recognition word. If it is decided that the correlation value is equal to or larger than the specific value and the recognition word is valid, it is assumed that the spoken word has been recognized as the instruction phrase and the operation proceeds to step S106. In step S106, the recognition word achieving the largest correlation value is echoed back by voice.

In addition, in step S106, the navigation apparatus 100 is notified that the instruction phrase has been recognized before ending the processing. While the navigation apparatus 100 is thus notified, it is also provided with the additional information such as the category of the instruction phrase. Based upon the instruction phrase transmitted via the communication line 211, the navigation apparatus 100 engages in the navigation operation. For instance, if the user says "Bird View" and this instruction phrase is recognized, an echo-back of voice echo-back "bird's eye view display" is output by utilizing the D/A conversion unit 203, the amplifier 204 and the speaker 205. The navigation apparatus 100 is thus notified that the instruction phrase "Bird View" has been recognized and the navigation apparatus 100 brings up the bird's eye view display (three-dimensional road map display) on the display device 109 based upon the map information and the like at the CD-ROM drive 108.

If, on the other hand, the largest correlation value is determined to be less than the specific value in step 105, it is assumed that the spoken word has not been recognized and the operation proceeds to step S107. In this case, the spoken word is not similar to any of the recognition words including both the valid words and the invalid words and, as a result, none of the calculated correlation values is larger than the specific value.

In addition, if the largest correlation value is equal to or larger than the specific value but the corresponding recognition word is an invalid recognition word, too, it is assumed that the spoken phrase has not been recognized and the operation proceeds to step S107. For instance, "Map" in the example above may have been spoken with the recognition word "cup" achieving the largest correlation value, equal to or larger than the specific value. In this case, too, it is assumed that no valid instruction phrase has been recognized and the operation proceeds to step S107. In step 107, a message "recognition failed" is echoed back by voice, and the processing ends. The navigation apparatus 100 does not engage in any processing.

As described above, specific invalid words are stored in the recognition dictionary. Thus, even when an instruction phrase which is not valid is spoken, it is not erroneously recognized as one of the valid instruction phrases, thereby ensuring that no navigation operation which is not intended by the user is performed. As a result, a user such as the driver can give voice instructions in a worry-free manner.

While an explanation is given above in reference to the embodiment on an example in which voice recognition of instruction phrases, the present invention is not limited to this example. For instance, it may be adopted when performing a voice recognition of facility names such as ski resort names and station names.

Fourth Embodiment

In the car navigation system in the fourth embodiment, successful voice recognition is achieved with a high degree of reliability even when the user speaks part of a phrase with a given meaning using a slightly different pronunciation or with an alternative expression. Since the structure of the car navigation system in the fourth embodiment is identical to that adopted in the car navigation system in the first embodiment illustrated in FIG. 1, its explanation is omitted.

Since the recognition dictionary used in this embodiment is different from that in the first embodiment, an explanation is given below on the recognition dictionary in the fourth embodiment. FIG. 8 shows a hospital name recognition dictionary in the prior art in which a recognition word corresponding to one hospital name is stored. While a plurality of recognition words are normally stored in a recognition dictionary, only one is shown in the figure to facilitate the explanation. A recognition word is constituted of pronunciation data of the corresponding facility name (a hospital name in FIG. 8). In FIG. 8, "pronunciation" is indicated by using phonetic symbols (pronunciation symbols, International Phonetic Symbols). In a recognition dictionary, phonetic symbol codes corresponding to specified phonetic symbols are stored. "Display character data" and "additional information" are attached to each recognition word. As the display character data, the character codes corresponding to the facility name as it is to be displayed on the display device 109 or the like is stored. In the example presented in FIG. 8, the facility name as spelled in the "Display" section is stored. As the additional information, various types of information such as coordinate information indicating the coordinates of the facility on a map, the number assigned to the recognition dictionary to be read next and attribute information indicating various attributes of the facility are stored. FIG. 8 only shows the coordinate information as an example.

FIG. 9 shows a hospital name recognition dictionary achieved by adopting the present invention, which corresponds to the hospital name recognition dictionary in the prior shown in FIG. 8. The contents of the "Display" and "Additional information" sections in FIG. 9 are identical to those in the "Display" and "Additional information" section in FIG. 8, with the contents of the "Pronunciation" section differing from those in FIG. 8. While the pronunciation of "Tokyo Central Hospital "is "toukyousentrəlhaspitl," the pronunciation in FIG. 9 is tɔ:kyɔ:sentrəlhaspitl." In other words, "toukyou" is changed to "tɔ:kyɔ:".

The standard pronunciation of "Tokyo" is "toukyou." The standard pronunciation as referred to in this context is the correct pronunciation of the word as given in dictionaries and the like. However, common pronunciation used in actual daily conversation is often slightly different, and, for instance, "tɔ:kyɔ:" using "ɔ:" rather than "ou" is in fact closer to the actual pronunciation. Accordingly, in the fourth embodiment, the pronunciation which is more likely to be heard in actual conversation is ascertained in advance with regard to a word (keyword) frequently used in a given category, and if there is a phrase that contains the keyword in a recognition dictionary, a recognition word is prepared by replacing the pronunciation of the keyword with the pronunciation closer to that more commonly heard in actual conversation. In this example, "Tokyo" is the keyword.

While an explanation is given above on an example in which "Tokyo" is the keyword, the present invention may be adopted as in the following example as well. While the standard pronunciation of the word "semiconductor" is "semikəndΛktər" the word may be pronounced "semaikəndΛktər" instead. Thus, if there is a recognition word which includes "semiconductor," a recognition word may be created by replacing "semikəndΛktər" with "semaikəndΛktər" in the "semiconductor" portion of the recognition word. In addition, "Los Angeles" may be referred to as a "LA (elei)." In such a case, the "Los Angeles" portion of a recognition word containing "Los Angeles" may be replaced with "LA (elei)."

Figure 10:
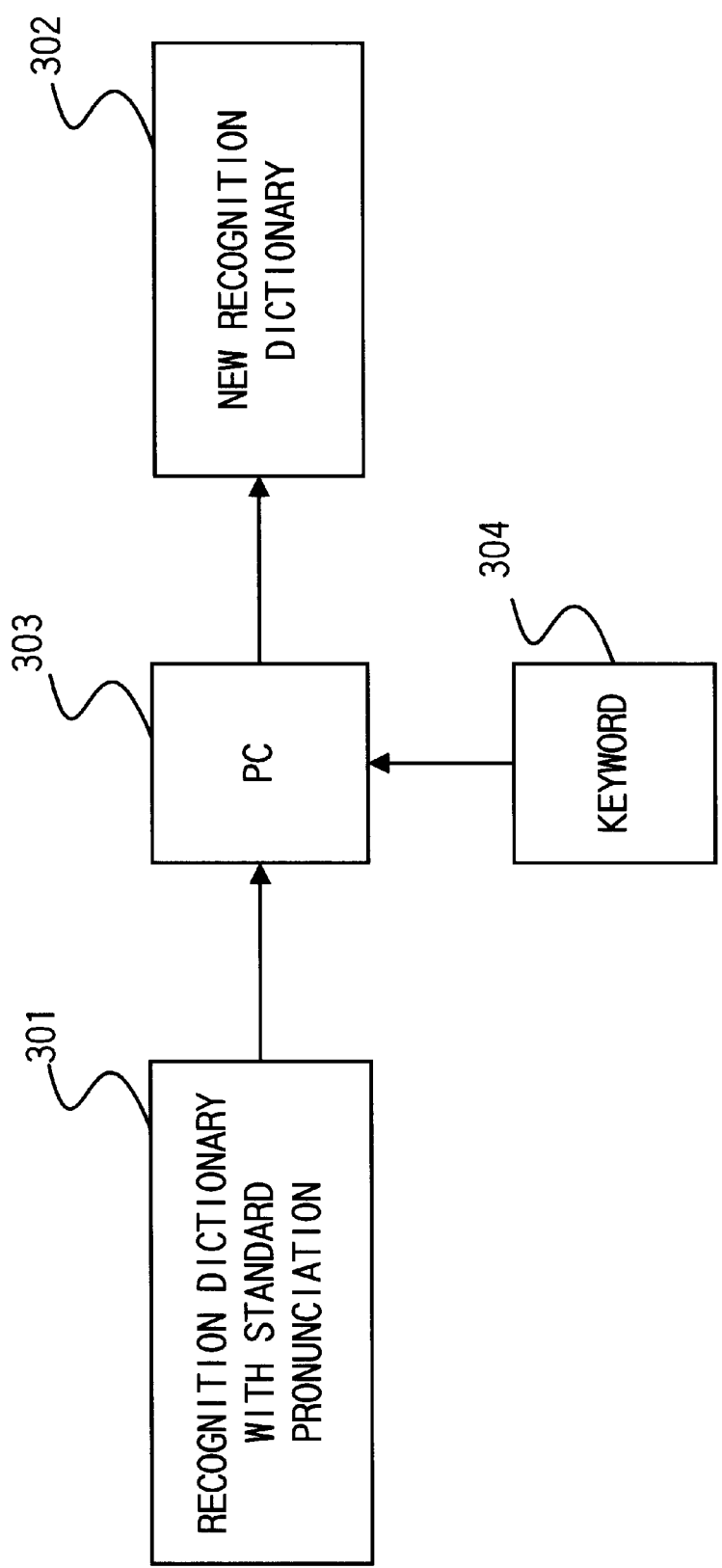
FIG. 10 illustrates the structure through which the new recognition dictionary is created from the standard pronunciation recognition dictionary in the fourth embodiment.
Figure 11:
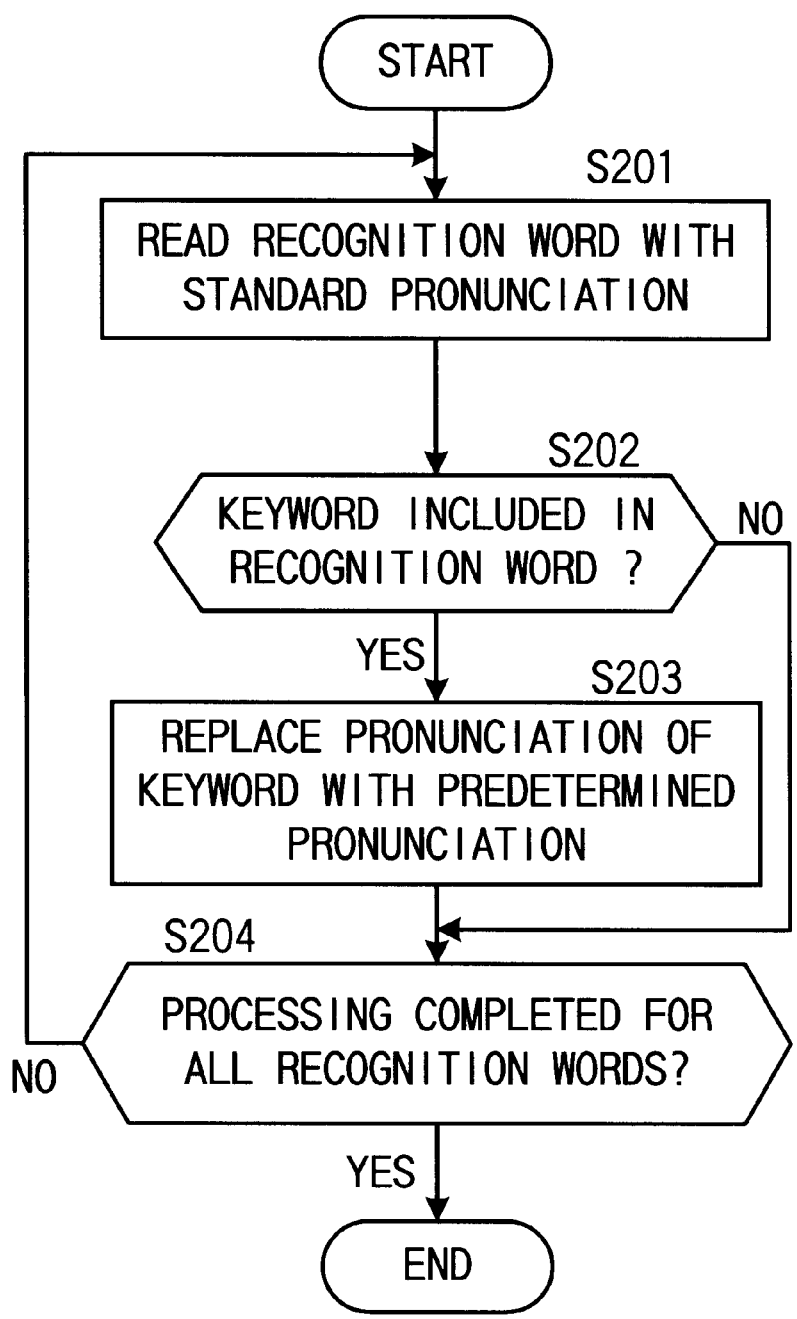
FIG. 11 presents a flowchart of the processing for creating the new recognition dictionary from the standard pronunciation recognition dictionary in the fourth embodiment.

FIG. 10 illustrates a structure in which a new recognition dictionary 302 in FIG. 9 is generated on a personal computer (hereafter referred to as a PC) 303 by using a recognition dictionary 301 in the prior art in which recognition words with standard pronunciations are store, as shown in FIG. 8. The recognition dictionary 301 is stored at a recording medium such as a CD-ROM and the recognition dictionary 302 is generated on a hard disk (not shown). A keyword 304 is ascertained in advance and stored as a file in the hard disk of the PC 303. FIG. 11 presents a flowchart of the processing executed by the PC 303. The keyword 304 may be entered through a keyboard (not shown). The recognition dictionary 302 thus generated is written in the ROM and is installed as the ROM 210 of the voice unit 200 shown in FIG. 1.

The following is an explanation of the processing in FIG. 11. In step S201, a recognition word is read from a recognition dictionary file in which recognition words with standard pronunciations are stored as shown in FIG. 8. The more common pronunciations of words (keywords) often used in the category are ascertained in advance and stored in the computer in advance. In step S202, a decision is made as to whether or not a specific keyword is contained in the recognition word that has been read, and if it is decided that the specific keyword is contained, the operation proceeds to step S203. In step S203, the pronunciation corresponding to the keyword in the recognition word is replaced with the more common pronunciation ascertained in advance. If, on the other hand, it is decided in step S202 that none of the keywords is contained in the recognition word, the operation skips step S203 and advances to step S204. In step S204, a decision is made as to whether or not the processing has been completed for all the recognition words, and if it is decided that the processing has not been completed, the operation returns to step S201 to repeat the processing. If the processing has been completed, the processing ends.

It is to be noted that in step S203, a new recognition word achieved by replacing the pronunciation of the keyword with the more common pronunciation ascertained in advance may be simply added, with the recognition word with the standard pronunciation left intact in the dictionary instead. In such a case, a voice recognition can be performed by using both the recognition word with the standard pronunciation and the new recognition word.

Figure 12:
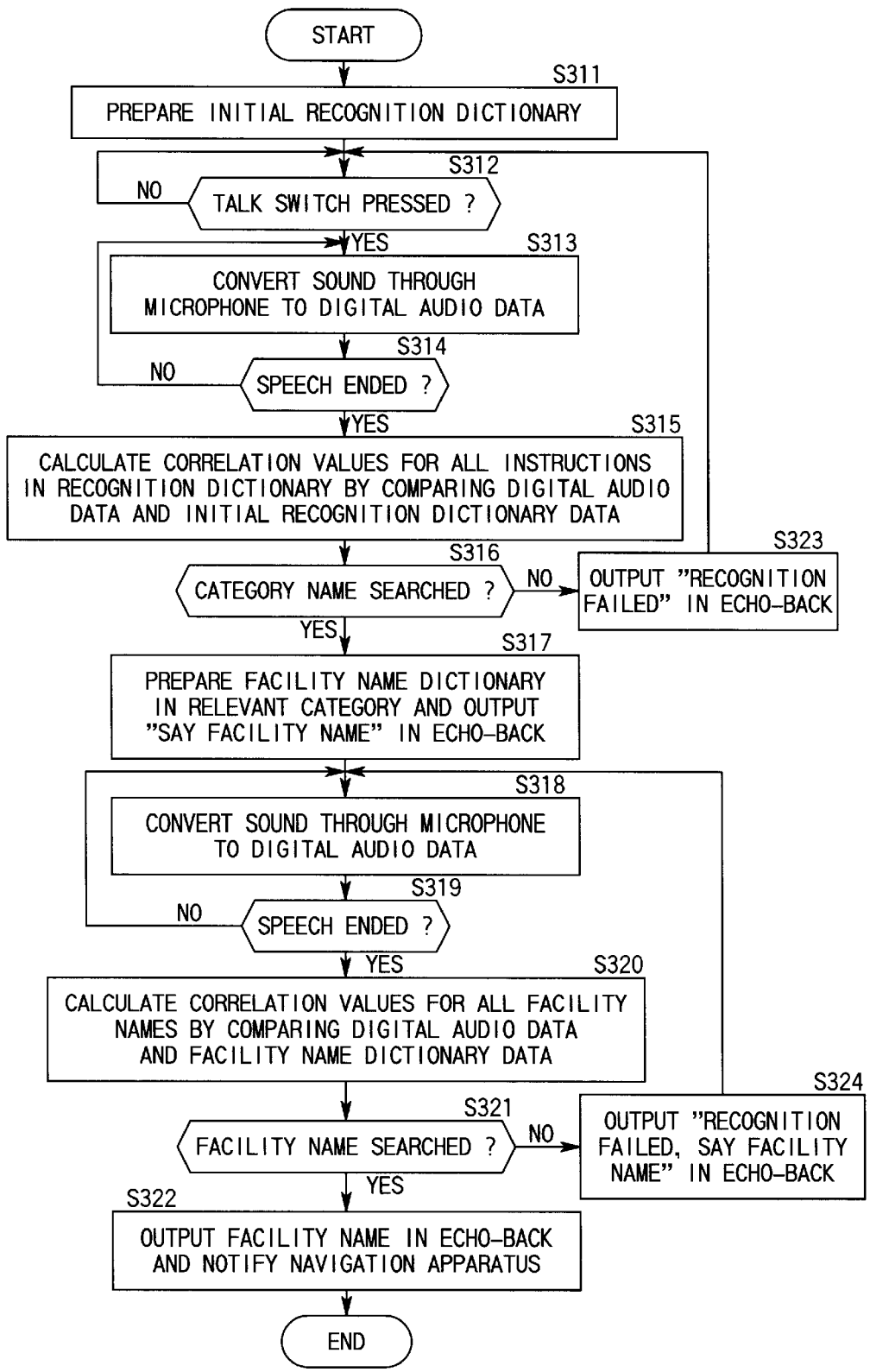
FIG. 12 presents a flowchart of the control for implementing voice recognition in the fourth embodiment.

FIG. 12 is a flowchart of the control implemented to perform voice recognition on the voice unit 200. The control program, which is stored in the ROM 210, is executed by the CPU 208. This routine starts when the power to the navigation apparatus 100 and the voice unit 200 is turned on.

With regard to this routine, an explanation is given on a hypothetical situation in which, for instance, the "facility category name" is input by voice and then the actual "facility name" is input by voice to display a map of the area around the facility on the display device 109. In step S311, an initial recognition dictionary is prepared. In the initial recognition dictionary, recognition words such a "hospitals", "police stations" and "post offices" indicating facility types are stored. In step S312, a decision is made as to whether or not the TALK switch 206 has been pressed and if it is decided that the TALK switch 206 has been pressed, the operation proceeds to step S313. If, on the other hand, it is decided that the TALK switch 206 has not been pressed, this step is repeated. After pressing the TALK switch 206, the user speaks a facility category name, e.g., "Hospitals" within a specific period of time. In step S313, the audio signal obtained through the microphone 201 is converted to digital audio data. In step S314, a decision is made as to whether or not the speech has ended. The speech is judged to have ended when the audio signal has lapsed over a specific length of time. If it is decided that the speech has ended, the operation proceeds to step S315, whereas if it is decided that the speech has not ended, the operation returns to step S313.

In step S315, the correlation values between the digital audio data obtained in step S313 and all the recognition words in the initial recognition dictionary prepared in step S311 are calculated, and then the operation proceeds to step S316. In step S316, a decision is made as to whether not the largest correlation value among the correlation values thus calculated is equal to or larger than a specific value. If it is decided that the correlation value is equal to or larger than the specific value, the operation proceeds to step S317 by assuming that the spoken phrase has been recognized. In step S317, the recognition word achieving the largest correlation value is recognized as the "facility category name" and accordingly, the facility name dictionary of this category is prepared and a message "say the facility name" is output in an echo-back. If the category is "hospitals," the hospital name recognition dictionary in FIG. 9, which has been generated in advance in the routine in FIG. 11, is prepared.

If, on the other hand, it is decided in step S316 that the largest correlation value is less than the specific value, the operation proceeds to step S323 by assuming that the spoken phrase has not been recognized. In step S323, a message "recognition failed" is echoed back by voice, and the operation returns to step S312.

When the message "say the facility name" is output in an echo-back in step S317, the user says the hospital name shown in FIG. 9, for instance. In step S318, the audio signal obtained through the microphone 201 is converted to digital audio data. In step S319, a decision is made as to whether or not the speech has ended. The speech is judged to have ended when the audio signal has lapsed over a specific length of time. If it is decided that the speech has ended, the operation proceeds to step S320, whereas if it is decided that the speech has not ended, the operation proceeds to step S318.

In step S320, the correlation values between the digital audio data obtained in step S318 and all the recognition words in the recognition dictionary in FIG. 9 are calculated, and then the operation proceeds to step S321. The recognition dictionary shown in FIG. 9 achieved by replacing the pronunciation of the keyword in the recognition dictionary in FIG. 8 is used. In step S321, a decision is made as to whether not the largest correlation value among the correlation values thus calculated is equal to or larger than a specific value. If it is decided that the largest correlation value is equal to or larger than the specific value, the operation proceeds to step S322 by assuming that the spoken phrase has been recognized. In step S322, the recognition word achieving the largest correlation value is echoed back by voice.

In addition, in step S322, the navigation apparatus 100 is notified that the hospital name (facility name) has been recognized, before ending the processing. The notification to the navigation apparatus 100 is made by providing the display character data and the coordinates of the facility on the map in the additional information. The navigation apparatus 100 displays a road map of the area around the facility on the display device 109 based upon the coordinate data corresponding to the hospital (facility) on the map transmitted via the communication line 211, the map information at the CD-ROM drive 108 and the like.

If, on the other hand, the largest correlation value is determined to be smaller than the specific value in step S321, it is assumed that the spoken phrase has not been recognized and the operation proceeds to step S324. In step S24, "recognition failed" is echoed back by voice and then the operation returns to step S318.

As described above, a recognition dictionary in which recognition words created by replacing the standard pronunciation of a keyword often used in the particular category with a more common, different pronunciation are stored, is used for voice recognition. As a result, a successful a voice recognition is achieved with a high degree of reliability. In particular, since the recognition dictionary is created by using a recognition dictionary used in the prior art and replacing the pronunciation of the keyword portion alone, a new recognition dictionary, which will achieve an improvement in the voice recognition success rate can be prepared easily and promptly at low cost. In addition, a recognition dictionary having standard pronunciations stored therein that is commercially available may be purchased to create a recognition dictionary that will achieve a further improvement in the voice recognition success rate easily and quickly at low cost based upon the purchased recognition dictionary.

Fifth Embodiment

As shown in FIGS. 10 and 11, in the fourth embodiment, the recognition dictionary in FIG. 9 is created in advance on the personal computer 303 and then the recognition dictionary thus created is installed in the ROM 210 of the voice unit 200 in FIG. 1. In the fifth embodiment, the recognition dictionary (see FIG. 9) is created on the voice unit as it becomes needed. Since the structure of the car navigation system in the fifth embodiment is identical to that in FIG. 1 illustrating the first embodiment, its explanation is omitted.

Figure 13:
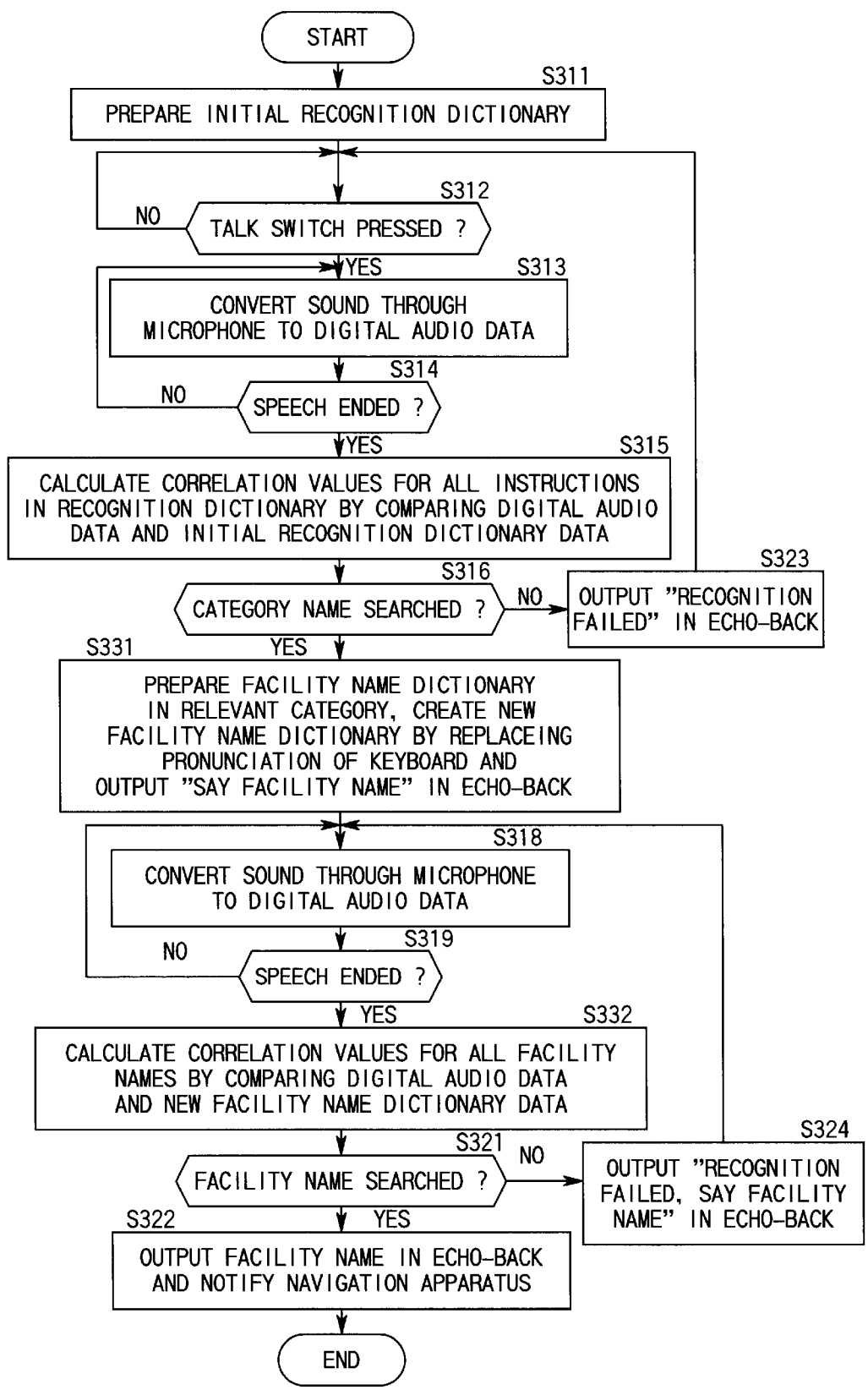
FIG. 13 presents a flowchart of the control for implementing voice recognition in a fifth embodiment.

FIG. 13 presents a flowchart of the control for implementing voice recognition on the voice unit 200 in the fifth embodiment. Since it differs from the flowchart in FIG. 12 illustrating the fourth embodiment only in that step S317 in FIG. 12 is replaced with step S331 and that step S320 is replaced with step S332, the following explanation focuses on the processing performed in step S331 and step S332.

In the fifth embodiment, the recognition dictionary in the prior art in FIG. 8 and pronunciation data of keywords in the relevant category (the standard pronunciation data and alternative pronunciation data (see FIG. 14)) are provided in the ROM 210 of the voice unit 200. The creation of the recognition dictionary shown in FIG. 11 is executed in step S331. Namely, in step S331 in FIG. 13, the recognition word achieving the largest correlation value is first recognized as the "facility category name," and then the facility name dictionary (the recognition dictionary in FIG. 8) corresponding to the relevant category is opened. Next, using the facility name dictionary thus opened and the standard pronunciation data and the alternative pronunciation data of the keywords (see FIG. 14), processing similar to that shown in FIG. 11 is performed to create a new facility name dictionary (the recognition dictionary in FIG. 9) by replacing the pronunciations of the keyword. A message "say the facility name" is then output in echo-back. In step S332, the correlation values between the digital audio data obtained in step S318 and all the recognition words in the new recognition dictionary (see FIG. 9) created in step S331 are calculated. Since the other aspects of the processing are identical to those in the fourth embodiment, their explanation is omitted.

In the fifth embodiment, the recognition dictionary with the standard pronunciations is stored in the ROM 210 and the new recognition dictionary is stored in the RAM 209. Instead of creating a completely new recognition dictionary, recognition words each containing a keyword alone may be created as additional recognition words at the RAM 209. In such a case, the correlation values can be calculated relative to both the standard recognition words and the additional recognition words to enable an even more accurate voice recognition.

As described above, successful voice recognition can be achieved with a high degree of reliability in the fifth embodiment, as in the fourth embodiment. In particular, since only the keyword data need to be stored in addition to the standard recognition words at the ROM 210, a highly accurate voice recognition is achieved while requiring a small storage capacity.

Sixth Embodiment

In the fourth embodiment, a new recognition word is created by replacing the standard pronunciation of a specific keyword with a more commonly used pronunciation. In the sixth embodiment, a plurality of pronunciations are prepared for a specific keyword and new recognition words each containing one of the alternatives to the keyword, are added to the recognition dictionary. Since the structure assumed by the car navigation system in the sixth embodiment is identical to the structure shown in FIG. 1 illustrating the first embodiment, its explanation is omitted.

The recognition dictionaries used in the sixth embodiment are now explained. FIGS. 15A~15C show recognition dictionaries in the prior art having stored therein recognition words in the post office category, the street category and the interchange/ramp category respectively. FIGS. 16A~16C show recognition dictionaries created by adopting the present invention in the sixth embodiment, respectively corresponding to those in FIGS. 15A~15C.

An explanation is given on an example in which a facility name "Zama Post Office" is a specified in the post office category in FIG. 15A. In response to the prompt output by the navigation system, "say the category name," the user says "post office." Then, the user may become uncertain as to whether he should say "Zama Post Office" or simply "Zama" in response to the prompt, "say the category name." The recognition dictionary in FIG. 16A contains a recognition word with two different recognition words for "Zama Post Office," i.e., "zamapostoffice" and "zama." Consequently, a successful voice recognition is achieved regardless of whether the user says "Zama Post Office" or "Zama."

Next, an explanation is given on an example in which a facility name "Queen Street" is specified in the street category in FIG. 15B. The user may become uncertain as to whether he should say "Queen Street" or simply "Queen" in response to the prompt "say the street name." The recognition dictionary in FIG. 16B contains two recognition words that may refer to "Queen Street," i.e., "queenstreet" and "queen" and thus, a successful the voice recognition is achieved regardless of how the user says the street name.

FIG. 16C shows an example in which a plurality of alternative words, i.e., "interchange," "inter" and "(null)" for the keyword "IC," are provided.

Namely, when the spoken expression for the last portion of a recognition word represents a specific keyword, new recognition words created by replacing the specific keyword with a plurality of alternatives are added in FIGS. 16A, 16B and 16C. FIG. 17 lists the alternatives for the keywords in FIGS. 16A~16C. For instance, when the standard pronunciation of a recognition word "Zama Post Office" is "zamapostoffice," a search is performed to ascertain if any of the keywords in FIG. 17 is contained in zamapostoffice, and upon finding the keyword "postoffice" a recognition word created by replacing the keyword with the alternative, i.e., "zama," is added.

It is to be noted that as in the cases of "postoffice" and "interchange" in FIG. 17, an alternative may be the total omission of the keyword. In addition, alternative pronunciations such as "ic" and "inter" are provided with regard to "interchange," since they are commonly used as alternative ways of referring to an interchange. Likewise, "parking" is provided as an alternative to "servicearea" since it is commonly used as an alternative way of referring to a service area. Referring to a parking area as "parking" may be considered as an abbreviation. Furthermore, the individual facility names in the categories shown in FIGS. 15A~15C each comprises a geographical name and a term used to specify the facility type. Thus, the name of a given facility category may be used as a keyword.

Figure 18:
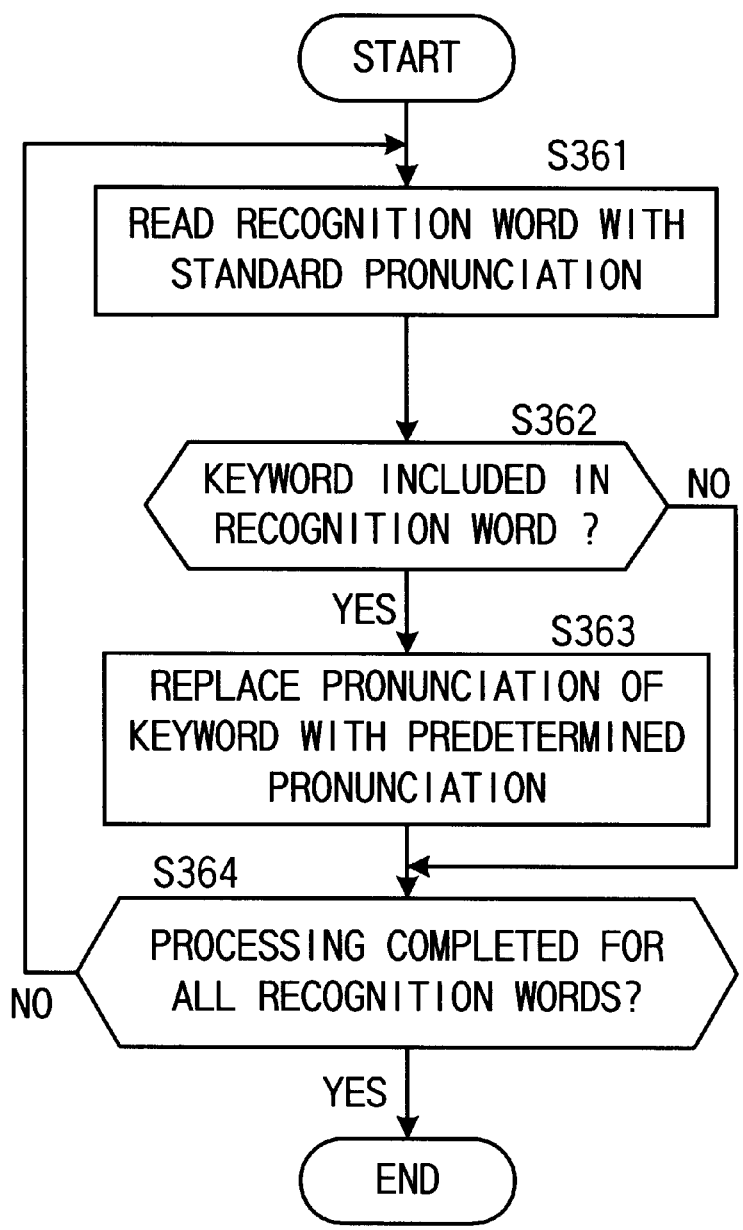
FIG. 18 presents a flowchart of the processing for creating a new recognition dictionary from the standard pronunciation recognition dictionary in the sixth embodiment.

FIG. 18 is a flowchart of the control implemented to create the recognition dictionaries in FIGS. 16A~16C using the recognition dictionaries in the prior art shown in FIGS. 15A~15C in which recognition words with their standard pronunciations are stored. The creation of the recognition dictionaries in FIGS. 16A~16C is executed by the personal computer 303 as in FIG. 10, and the recognition dictionaries thus created are written in the ROM and installed as the ROM 210 of the voice unit 200 in FIG. 1.

In step S361, a recognition word is read from the recognition dictionary file in which the recognition words with their standard pronunciations shown in FIGS. 15A~15C are stored. As shown in FIG. 17, alternative pronunciations of words or phrases (keywords) that are commonly used in the specific categories are ascertained and stored at the personal computer 303 in advance. In step S362, a decision is made as to whether or not a specific keyword is contained in the recognition word that has been read, and if it is decided that it contains the specific keyword, the operation proceeds to step S363. In step S363, a new recognition word is created by replacing the standard pronunciation of the keyword in the recognition word with an alternative pronunciation. If, on the other hand, it is decided in step S362 that the recognition word does not contain any keyword, the operation skips step S363 and advances to step S364. In step S364, a decision is made as to whether or not the processing has been completed for all the recognition words, and if it is decided that the processing has not been completed, the operation returns to step S361 to repeat the processing. If it is decided that the processing has been completed, the processing ends.

In the sixth embodiment, the recognition dictionaries ein FIGS. 16A~16C are created in advance on the personal computer 303 shown in FIG. 10 and the recognition dictionaries thus created are installed in the ROM 210 of the voice unit 200 in FIG. 1. However, as in the fifth embodiment, a recognition dictionary may be created on the RAM 209 as it becomes needed in the voice unit. In such a case, since the ROM 210 needs to hold only the recognition dictionaries in FIGS. 15A~15C and the alternative data for the keywords in FIG. 17, the capacity requirement for the ROM 210 is reduced to achieve a reduction in the cost.

As described above, since new recognition words created by taking into consideration alternative pronunciations of specific keywords contained in standard recognition words are added, successful voice recognition is achieved with a high degree of reliability.

Seventh Embodiment

In the sixth embodiment, if a recognition word contains a specific keyword, another recognition word achieved by deleting the keyword is added, as shown in FIG. 16A. In the seventh embodiment, a keyword (such as a category name) which is not contained in the original recognition word is added. For instance, in the case of the "train station" category, the "station" is normally included at the end of a recognition word in the recognition dictionary. However, if "station" is not included in a given recognition word, a new recognition word created by attaching "station" is added. Since the structure assumed by the car navigation system in the seventh embodiment is identical to the structure shown in FIG. 1 illustrating the first embodiment, its explanation is omitted.

For instance, if there is a recognition word "Tokyo" in the recognition dictionary in the "train station" category, a new recognition word "Tokyo Station" is added. In more specific terms, keyword data indicating a keyword to be added to recognition words in a given category are stored in the ROM 210 so that if it is decided that the keyword is not contained in a recognition word as a result of a keyword search, a new recognition word containing the keyword is added. A plurality of such keywords may be prepared. If there are a plurality of keywords, new recognition words created by attaching the individual keywords that are not contained in the original recognition word may be added. As a result, a successful voice recognition will be achieved regardless of whether the user says "Tokyo" or "Tokyo Station" while the "train station" category is open.

While an explanation is given on a car navigation system in reference to the first~seventh embodiments above, the present invention is not limited to these particulars and it may be adopted in a portable navigation system instead of a vehicle-mounted navigation system. Furthermore, it may also be adopted in all types of apparatuses engaged in voice recognition other than navigation apparatuses.

While an explanation is given above in reference to the first~seventh embodiments on a structure achieved by providing the navigation apparatus 100 and the voice unit 200 as separate units, the present invention is not limited to these particulars and may be adopted in an integrated navigation apparatus having an internal voice unit. In addition, the control program, of the recognition dictionaries and the like explained above may be provided in a recording medium such as a CD-ROM. Furthermore, the control program, the recognition dictionaries and the like may be provided in a recording medium such as a CD-ROM and the system described above may be realized on a computer such as a personal computer or a workstation.

Figure 19:
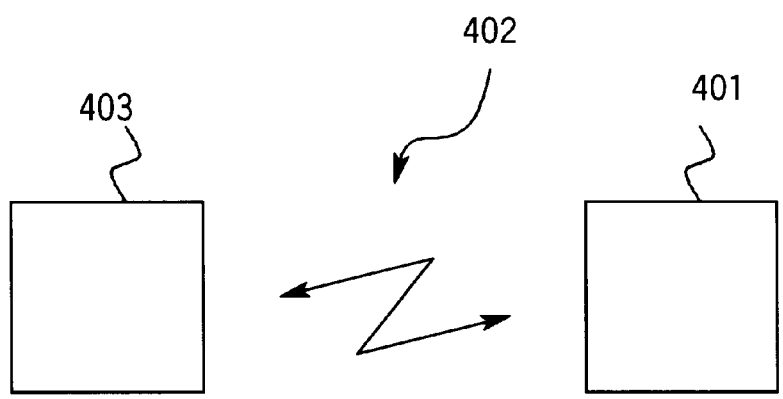
FIG. 19 illustrates how the program may be provided via a transmission medium.

Alternatively, the control program, the recognition dictionaries and the like may be provided via a transmission medium such as a communication line, a typical example of which is the Internet. In other words, the control program and the like may be converted to a signal that is transmitted through a transmission medium and be transmitted. FIG. 19 illustrates how this may be realized. A navigation apparatus 401 is the navigation apparatus explained earlier and has a function of connecting with a communication line 402. A computer 403 is a server computer in which the control program and the like are stored so that the control program and the like can be provided to the 401. The communication line 402 may be a communication line for Internet communication or personal computer communication, or it may be a dedicated communication line. The communication line 402 may be a telephone line or a wireless telephone line such as that for a mobile telephone connection.

While an explanation is given above in reference to the first~seventh embodiments on an example in which when a successful search of a facility name is achieved in the voice unit 200, the results of the search are provided to the navigation apparatus 100, and in response, the navigation apparatus 100 displays a map of the area around the facility as part of the navigation processing which includes route guidance, the present invention is not limited to these particulars. Various types of navigation processing such as route search and route guidance may be implemented in the navigation apparatus 100 based upon the results of a successful search performed by the voice unit 200.

What is claimed is:

1. A speech recognition apparatus, comprising:
   a voice input device;
   a first storage device that stores a first recognition word indicating a pronunciation of a word to undergo speech recognition;
   a second storage device that stores a specific word that includes a first pronunciation different from a second pronunciation, which specific word is prepared in advance as a word that is a common part of a plurality of words to undergo speech recognition;
   a generating device that judges whether or not a given word contains the specific word as a part of the given word and generates a second recognition word of the given word by replacing a second pronunciation of the specific word with the first pronunciation of the specific word when it has been judge that the given word contains the specific;

the second pronunciation being originally included in the first recognition word of the given word;

the first pronunciation being different from the second pronunciation; and a speech recognition processing device that performs speech recognition processing by comparing audio data obtained through the voice input device and speech recognition data created in correspondence to the second recognition word of the given word.

2. A speech recognition navigation apparatus, comprising:

a voice input device;

a first storage device that stores a first recognition word indicating a pronunciations of a word to undergo speech recognition;

a second storage device that stores a specific word that includes a first pronunciation different from a second pronunciation, which specific word is prepared in advance as a word that is a common part of a plurality of words to undergo speech recognition;

a generating device that judges whether or not a given word contains the specific word as a part of the given word and generates a second recognition word of the given word by replacing a second pronunciation of the specific word with the first pronunciation of the specific word when it has been judged that the given word contains the specific word;

the second pronunciation being originally included in the first recognition word of the given word;

the first pronunciation being different from the second pronunciation; and a speech recognition processing device that performs speech recognition processing by comparing audio data obtained through the voice input device and speech recognition data created in correspondence to the second recognition word of the given word;

a map information storage device that stores map information; and a control device that engages in control for providing route guidance based upon, at least, recognition results obtained by the speech recognition processing device and the map information.

3. A speech recognition navigation apparatus, comprising:

a voice input device;

a first storage device that stores a first recognition word indicating a pronunciation of a word to undergo speech recognition;

a second storage device that stores a specific word that is prepared in advance as a word that is a common part of a plurality of words to undergo speech recognition;

a generating device that judges whether or not a given word contains the specific word as a part of the given word and generates a second recognition word of the given word by adding a pronunciation of the specific word when it has been judged that the given word does not contain the specific word;

a speech recognition processing device that performs speech recognition processing by comparing audio data obtained through the voice input device and speech recognition data created in correspondence to the second recognition word of the given word;

a map information storage device that stores map information; and a control device that engages in control for providing route guidance based upon, at least, recognition results obtained by the speech recognition processing device and the map information.

4. A method of recognition word generation through which recognition words indicating pronunciations of words to undergo speech recognition used to generate speech recognition data to be compared against audio data obtained through a voice input device are generated, the method comprising the acts of:

obtaining a first recognition word of a given word to undergo speech recognition;

obtaining a specific word that includes a first pronunciation and is prepared in advance as a word that is a common part of a plurality of words to undergo speech recognition;

judging whether or not the given word contains the specific word as a part of the given word;

generating a second recognition word of the given word by replacing a second pronunciation of the specific word with the first pronunciation of the specific word when it has been judged that the given word contains the specific word; the second pronunciation being originally included in the first recognition word of the given word; and the first pronunciation being different from the second pronunciation.

5. A method of recognition word generation according to claim 4, wherein:

the second pronunciation of the specific word is a standard pronunciation.

6. A method of recognition word generation according to claim 4, wherein:

the second pronunciation of the specific word is a standard pronunciation; and the first pronunciation indicates how the specific word is pronounced in everyday life.

7. A method of recognition word generation according to claim 4, further comprising the act of:

storing both the first recognition word and the second recognition word for the given word.

8. A method of recognition word generation according to claim 4, wherein:

the first pronunciation is constituted of no sound made for the specific word.

9. A method of recognition word generation according to claim 4, wherein:

the first pronunciation of the specific word is constituted of a pronunciation corresponding to an alternative term or an abbreviated term for the specific word.

10. A recording medium that stores a recognition word generating program for generating recognition words indicating pronunciations of words to undergo speech recognition used to generate speech recognition data to be compared against audio data obtained through a voice input device in speech recognition processing, the recognition word generating program comprising:

an instruction of obtaining a first recognition word of a given word to undergo speech recognition;

an instruction of obtaining a specific word that includes a first pronunciation and is prepared in advance as a word that is a common part of a plurality of words to undergo speech recognition;

an instruction of judging whether or not the given word contains the specific word as a part of the given word;

an instruction of generating a second recognition word of the given word by replacing a second pronunciation of the specific word with the first pronunciation of the specific word when it has been judged that the given word contains the specific word;

the second pronunciation being originally included in the first recognition word of the given word; and the first pronunciation being different from the second pronunciation.

11. A data signal transmitted in a communication line that comprises a recognition word generating program for generating recognition words indicating pronunciations of words to undergo speech recognition used to generate speech recognition data to be compared against audio data obtained through a voice input device in speech recognition processing, the recognition word generating program comprising:

an instruction of obtaining a first recognition word of a given word to undergo speech recognition;

an instruction of obtaining a specific word that includes a first pronunciation and is prepared in advance as a word that is a common part of a plurality of words to undergo speech recognition;

an instruction of judging whether or not the given word contains the specific word as a part of the given word;

an instruction of generating a second recognition word of the given word by replacing a second pronunciation of the specific word with the first pronunciation of the specific word when it has been judged that the given word contains the specific word;

the second pronunciation being originally included in the first recognition word of the given word; and the first pronunciation being different from the second pronunciation.

12. A method of recognition word generation through which recognition words indicating pronunciations of words to undergo speech recognition used to generate speech recognition data to be compared against audio data obtained through a voice input device are generated, the method comprising the acts of:

obtaining a first recognition word of a given word to undergo speech recognition in a given category;

obtaining a specific word that is prepared in advance as a word that is a common part of a plurality of words to undergo speech recognition in the given category;

judging whether or not the given word contains the specific word as a part of the given word;

generating a second recognition word of the given word by adding a pronunciation of the specific word when it has been judged that the given word does not contain the specific word.

13. A speech recognition apparatus, comprising:

a voice input device;

a first storage device that stores a first recognition word indicating a pronunciation of a word to undergo speech recognition;

a second storage device that stores a specific word that is prepared in advance as a word that is a common part of a plurality of words to undergo speech recognition;

a generating device that judges whether or not a given word contains the specific word as a part of the given word and generates a second recognition word of the given word by adding a pronunciation of the specific word when it has been judged that the given word does not contain the specific word and;

a speech recognition processing device that performs speech recognition processing by comparing audio data obtained through the voice input device and speech recognition data created in correspondence to the second recognition word of the given word.

* * * * *